(12) United States Patent
Chen et al.

(10) Patent No.: US 9,541,745 B2
(45) Date of Patent: Jan. 10, 2017

(54) OPTICAL IMAGING LENS AND ELECTRONIC DEVICE COMPRISING THE SAME

(71) Applicants: Shih-Han Chen, Taichung (TW); Feng Chen, Taichung (TW); Jinhui Gong, Taichung (TW)

(72) Inventors: Shih-Han Chen, Taichung (TW); Feng Chen, Taichung (TW); Jinhui Gong, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 119 days.

(21) Appl. No.: 14/526,528

(22) Filed: Oct. 29, 2014

(65) Prior Publication Data

US 2015/0301308 A1  Oct. 22, 2015

(30) Foreign Application Priority Data

Apr. 16, 2014 (CN) .......................... 2014 1 0153384

(51) Int. Cl.
*G02B 13/18* (2006.01)
*G02B 9/60* (2006.01)
*G02B 13/00* (2006.01)

(52) U.S. Cl.
CPC ................. *G02B 13/18* (2013.01); *G02B 9/60* (2013.01); *G02B 13/0045* (2013.01)

(58) Field of Classification Search
CPC ............ G02B 9/00; G02B 9/60; G02B 13/00; G02B 13/001; G02B 13/0015; G02B 13/002; G02B 13/0045; G02B 13/14
See application file for complete search history.

(56) References Cited

U.S. PATENT DOCUMENTS

| | | | |
|---|---|---|---|
| 7,480,105 B2 | 1/2009 | Mori |
| 7,486,449 B2 | 2/2009 | Miyano |
| 7,639,432 B2 | 12/2009 | Asami |
| 7,684,127 B2 | 3/2010 | Asami |
| 8,325,429 B2 | 12/2012 | Tang |
| 8,508,859 B2 | 8/2013 | Tsai |

(Continued)

FOREIGN PATENT DOCUMENTS

| | | |
|---|---|---|
| JP | 2010224521 | 10/2010 |
| JP | 4947235 | 6/2012 |

(Continued)

*Primary Examiner* — Thong Nguyen
(74) *Attorney, Agent, or Firm* — Winston Hsu; Scott Margo

(57) ABSTRACT

An optical imaging lens includes: a first, second, third, fourth and fifth lens element, the first lens element has an object-side surface with a convex part in a vicinity of the optical axis and a convex part in a vicinity of its periphery; the second lens element has an object-side surface with a convex part in a vicinity of its periphery; the third lens element has positive refractive power, having an object-side surface with a concave part in a vicinity of its periphery; the fourth lens element has positive refractive power, having an object-side surface with a concave part in a vicinity of its periphery and an image-side surface with a convex part in a vicinity of the optical axis; the fifth lens element has an image-side surface with a concave part in a vicinity of the optical axis and a convex part in a vicinity of its periphery.

16 Claims, 25 Drawing Sheets

(56) References Cited

U.S. PATENT DOCUMENTS

| | | | | |
|---|---|---|---|---|
| 2007/0229984 | A1* | 10/2007 | Shinohara | G02B 9/60 359/763 |
| 2008/0192360 | A1 | 8/2008 | Chang | |
| 2011/0134305 | A1* | 6/2011 | Sano | G02B 13/0045 348/340 |
| 2011/0188131 | A1* | 8/2011 | Sano | G02B 13/18 359/714 |
| 2013/0016278 | A1* | 1/2013 | Matsusaka | G02B 13/18 348/360 |
| 2014/0293447 | A1* | 10/2014 | Noda | G02B 9/60 359/714 |

FOREIGN PATENT DOCUMENTS

| | | |
|---|---|---|
| TW | 201135304 | 10/2011 |
| TW | 201250332 | 12/2012 |
| TW | 201317615 | 5/2013 |

* cited by examiner

| | | First Example | | | | |
|---|---|---|---|---|---|---|
| | EFL(Effective Focal Length)= 3.908 mm., HFOV(Half Field Of View)= 37.51 deg., Total Length=4.950mm., Fno= 2.28 | | | | | |
| No. | | Curvature Radius | Ape. Stop Distance Lens Thickness Air Gap | Refractive Index | Abbe No. | Focal Length | Material |
| | Object | infinity | infinity | | | | |
| 11 | First Lens | 1.9862 | 0.6330 | 1.5441 | 56.1143 | 3.0549 | Plastic |
| 12 | | -9.2344 | 0.0203 | | | | |
| 80 | Ape. Stop | infinity | 0.0699 | | | | |
| 21 | Second Lens | 15.6874 | 0.3313 | 1.6397 | 23.5288 | -3.9433 | Plastic |
| 22 | | 2.1693 | 0.2089 | | | | |
| 31 | Third Lens | 4.1521 | 0.4372 | 1.5441 | 56.1143 | 6.2403 | Plastic |
| 32 | | -18.2741 | 0.4675 | | | | |
| 41 | Fourth Lens | -1.2168 | 0.4212 | 1.5441 | 56.1143 | 5.5432 | Plastic |
| 42 | | -0.9740 | 0.0769 | | | | |
| 51 | Fifth Lens | 4.5236 | 0.9107 | 1.5311 | 55.7441 | -4.2304 | Plastic |
| 52 | | 1.3992 | 0.5733 | | | | |
| 72 | Filter | infinity | 0.3000 | | | | |
| | | infinity | 0.5000 | | | | |
| 71 | Image Plane | infinity | 0.0000 | | | | |

FIG. 18

| No. | K | a4 | a6 | a8 |
|---|---|---|---|---|
| First Lens (11) | 0 | 0.001049905 | -0.040409772 | 0.03561656 |
| First Lens (12) | 0 | 0.023080644 | -0.00866775 | -0.00917076 |
| Second Lens (21) | 0 | -0.026426288 | 0.063449699 | 0.005738182 |
| Second Lens (22) | 0 | -0.082250401 | 0.011203266 | 0.106699501 |
| Third Lens (31) | -12.89497015 | -0.025338302 | -0.073261551 | -0.034661786 |
| Third Lens (32) | -1310.884544 | -0.013383483 | -0.041744676 | -0.059302026 |
| Fourth Lens (41) | 0 | 0.286714132 | -0.047396741 | -0.018703184 |
| Fourth Lens (42) | -1.954733175 | 0.090034916 | -0.016146672 | 0.010777322 |
| Fifth Lens (51) | -15.75113975 | -0.087177463 | 0.018415121 | 0.001626364 |
| Fifth Lens (52) | -8.754125244 | -0.046653715 | 0.009532618 | -0.001641935 |
| No. | a10 | a12 | a14 | a16 |
| First Lens (11) | -0.019663959 | 0 | 0 | 0 |
| First Lens (12) | -0.001081794 | 0 | 0 | 0 |
| Second Lens (21) | -0.087712062 | 0.049219482 | 0 | 0 |
| Second Lens (22) | -0.129415738 | 0.010313143 | 0 | 0 |
| Third Lens (31) | 0.044236275 | 0.063527897 | -0.071436361 | 0 |
| Third Lens (32) | -0.011236918 | 0.012563745 | 0.02980923 | 0 |
| Fourth Lens (41) | -0.030897581 | 0.011579924 | 0.017540013 | 0.000746064 |
| Fourth Lens (42) | -0.000198363 | -0.001591512 | -0.000598178 | 0.000255465 |
| Fifth Lens (51) | -0.000593972 | -0.000137136 | -3.77933E-08 | 6.64359E-06 |
| Fifth Lens (52) | 4.48397E-05 | 1.51842E-05 | 1.03618E-07 | -2.85113E-07 |

FIG. 19

| Second Example |||||||
|---|---|---|---|---|---|---|
| EFL(Effective Focal Length)= 3.907 mm., HFOV(Half Field Of View)= 37.52 deg., Total Length=4.950mm., Fno= 2.28 |||||||
| No. | | Curvature Radius | Ape. Stop Distance Lens Thickness Air Gap | Refractive Index | Abbe No. | Focal Length | Material |
| | Object | infinity | infinity | | | | |
| 11 | First Lens | 1.9883 | 0.6314 | 1.5441 | 56.1143 | 3.0880 | Plastic |
| 12 | | -9.8398 | 0.0203 | | | | |
| 80 | Ape. Stop | infinity | 0.0715 | | | | |
| 21 | Second Lens | 16.2890 | 0.3278 | 1.6397 | 23.5288 | -3.9724 | Plastic |
| 22 | | 2.1953 | 0.2108 | | | | |
| 31 | Third Lens | 4.0206 | 0.4504 | 1.5441 | 56.1143 | 6.0884 | Plastic |
| 32 | | -18.4224 | 0.4708 | | | | |
| 41 | Fourth Lens | -1.1987 | 0.4086 | 1.5441 | 56.1143 | 5.4422 | Plastic |
| 42 | | -0.9569 | 0.0752 | | | | |
| 51 | Fifth Lens | 4.7509 | 0.9157 | 1.5311 | 55.7441 | -4.1051 | Plastic |
| 52 | | 1.3975 | 0.5676 | | | | |
| 72 | Filter | infinity | 0.3000 | | | | |
| | | infinity | 0.5000 | | | | |
| 71 | Image Plane | infinity | 0.0000 | | | | |

FIG. 20

| No. | K | a4 | a6 | a8 |
|---|---|---|---|---|
| First Lens (11) | 0 | 0.002769451 | -0.040723439 | 0.036076756 |
| First Lens (12) | 0 | 0.021835776 | -0.011350149 | -0.00415159 |
| Second Lens (21) | 0 | -0.034371016 | 0.074216903 | -0.030784634 |
| Second Lens (22) | 0 | -0.087439442 | 0.01026091 | 0.096266324 |
| Third Lens (31) | -9.141539587 | -0.031424352 | -0.072828306 | -0.046634649 |
| Third Lens (32) | -1581.843106 | -0.016777879 | -0.023966182 | -0.083984782 |
| Fourth Lens (41) | 0 | 0.303247153 | -0.071328477 | 0.016706985 |
| Fourth Lens (42) | -2.095555595 | 0.069601541 | -0.010111775 | 0.01651957 |
| Fifth Lens (51) | -18.54605478 | -0.094028704 | 0.019393906 | 0.001985359 |
| Fifth Lens (52) | -8.908177845 | -0.047807321 | 0.009598501 | -0.001588849 |
| No. | a10 | a12 | a14 | a16 |
| First Lens (11) | -0.01959203 | 0 | 0 | 0 |
| First Lens (12) | -0.003029264 | 0 | 0 | 0 |
| Second Lens (21) | -0.026473164 | 0.015235413 | 0 | 0 |
| Second Lens (22) | -0.119238048 | 0.008406969 | 0 | 0 |
| Third Lens (31) | 0.059562736 | 0.006179407 | -0.036582296 | 0 |
| Third Lens (32) | -0.015504564 | 0.029231804 | 0.017409782 | 0 |
| Fourth Lens (41) | -0.036892451 | 0.000920717 | 0.020487545 | 0.002342764 |
| Fourth Lens (42) | -0.00016251 | -0.002647542 | -0.001076965 | 0.000471261 |
| Fifth Lens (51) | -0.000602635 | -0.000156899 | -8.82446E-06 | 9.11892E-06 |
| Fifth Lens (52) | 1.96511E-05 | 1.62857E-05 | 7.44442E-07 | -3.62106E-07 |

FIG. 21

| | | Third Example | | | | | |
|---|---|---|---|---|---|---|---|
| | | EFL(Effective Focal Length)= 4.192 mm., HFOV(Half Field Of View)= 35.59 deg., | | | | | |
| | | Total Length=5.540 mm., Fno= 2.28 | | | | | |
| No. | | Curvature Radius | Ape. Stop Distance Lens Thickness Air Gap | Refractive Index | Abbe No. | Focal Length | Material |
| | Object | infinity | infinity | | | | |
| 11 | First Lens | 1.8528 | 0.6522 | 1.5441 | 56.1143 | 3.6087 | Plastic |
| 12 | | 27.2349 | 0.0522 | | | | |
| 80 | Ape. Stop | infinity | 0.0785 | | | | |
| 21 | Second Lens | 11.4185 | 0.2439 | 1.6397 | 23.5288 | -5.6879 | Plastic |
| 22 | | 2.7520 | 0.3326 | | | | |
| 31 | Third Lens | -21.6195 | 0.3660 | 1.5441 | 56.1143 | 9.8569 | Plastic |
| 32 | | -4.3345 | 0.5260 | | | | |
| 41 | Fourth Lens | -1.5065 | 0.5884 | 1.5441 | 56.1143 | 6.5118 | Plastic |
| 42 | | -1.2041 | 0.0785 | | | | |
| 51 | Fifth Lens | 2.7398 | 0.9210 | 1.5311 | 55.7441 | -6.3418 | Plastic |
| 52 | | 1.3363 | 0.6942 | | | | |
| 72 | Filter | infinity | 0.3000 | | | | |
| | | infinity | 0.6068 | | | | |
| 71 | Image Plane | infinity | 0.0000 | | | | |

FIG. 22

| No. | K | a4 | a6 | a8 |
|---|---|---|---|---|
| First Lens (11) | 0 | 0.012008151 | 0.001687227 | 0.005558464 |
| First Lens (12) | 0 | 0.03290137 | -0.010369245 | 0.0263524 |
| Second Lens (21) | 0 | -0.001307956 | -0.056443656 | 0.06522414 |
| Second Lens (22) | 0 | -0.001161903 | -0.091246 | 0.137510326 |
| Third Lens (31) | 435.9639687 | -0.029547513 | -0.03713362 | -0.062389006 |
| Third Lens (32) | -50.97894896 | -0.066340591 | 0.039490557 | -0.072614677 |
| Fourth Lens (41) | 0 | 0.247420506 | -0.088732878 | 0.008343365 |
| Fourth Lens (42) | -1.949262909 | 0.076433171 | -0.024640273 | 0.001381469 |
| Fifth Lens (51) | -9.651080767 | -0.047495864 | 0.003320855 | 0.000765254 |
| Fifth Lens (52) | -6.274383085 | -0.030217908 | 0.003888884 | -0.000394856 |
| No. | a10 | a12 | a14 | a16 |
| First Lens (11) | 0.005178423 | 0 | 0 | 0 |
| First Lens (12) | -0.021060673 | 0 | 0 | 0 |
| Second Lens (21) | -0.039384332 | -0.017961325 | 0 | 0 |
| Second Lens (22) | -0.108193958 | 0.01826594 | 0 | 0 |
| Third Lens (31) | 0.05532134 | -0.007744054 | 0.012118366 | 0 |
| Third Lens (32) | -0.02033628 | 0.041745392 | 0.000999531 | 0 |
| Fourth Lens (41) | -0.000884148 | 0.001238852 | -0.000756905 | 0.000854493 |
| Fourth Lens (42) | -0.0009958 | -6.44313E-05 | 0.00011813 | 3.32409E-05 |
| Fifth Lens (51) | 1.61913E-05 | -8.74703E-06 | -2.25784E-06 | 2.60038E-07 |
| Fifth Lens (52) | -6.17595E-06 | 3.59194E-06 | 1.67707E-07 | -2.58074E-08 |

FIG. 23

| Fourth Example | | | | | | |
|---|---|---|---|---|---|---|
| EFL(Effective Focal Length)= 4.107 mm., HFOV(Half Field Of View)= 36.15 deg., Total Length=5.591mm., Fno= 2.26 | | | | | | |

| No. | | Curvature Radius | Ape. Stop Distance Lens Thickness Air Gap | Refractive Index | Abbe No. | Focal Length | Material |
|---|---|---|---|---|---|---|---|
|  | Object | infinity | infinity |  |  |  |  |
| 11 | First Lens | 2.0178 | 0.6102 | 1.5441 | 56.1143 | 3.9732 | Plastic |
| 12 |  | 25.8378 | 0.0522 |  |  |  |  |
| 80 | Ape. Stop | infinity | 0.0477 |  |  |  |  |
| 21 | Second Lens | 4.9308 | 0.2699 | 1.6397 | 23.5288 | -5.6069 | Plastic |
| 22 |  | 2.0408 | 0.3937 |  |  |  |  |
| 31 | Third Lens | -21.8465 | 0.5975 | 1.5441 | 56.1143 | 9.3158 | Plastic |
| 32 |  | -4.1653 | 0.4162 |  |  |  |  |
| 41 | Fourth Lens | -1.6660 | 0.5838 | 1.5441 | 56.1143 | 5.1097 | Plastic |
| 42 |  | -1.1722 | 0.0774 |  |  |  |  |
| 51 | Fifth Lens | 1.6867 | 0.6336 | 1.5311 | 55.7441 | -6.3347 | Plastic |
| 52 |  | 0.9778 | 0.8671 |  |  |  |  |
| 72 | Filter | infinity | 0.3000 |  |  |  |  |
|  |  | infinity | 0.7414 |  |  |  |  |
| 71 | Image Plane | infinity | 0.0000 |  |  |  |  |

FIG. 24

| No. | K | a4 | a6 | a8 |
|---|---|---|---|---|
| First Lens (11) | 0 | 0.015306464 | -0.003654927 | 0.011679486 |
| First Lens (12) | 0 | 0.023573206 | 0.011964154 | -0.01413369 |
| Second Lens (21) | 0 | -0.027044017 | -0.035678884 | 0.057978103 |
| Second Lens (22) | 0 | -0.021140654 | -0.066003827 | 0.134689059 |
| Third Lens (31) | 425.2706736 | -0.034461339 | -0.011200698 | -0.032082015 |
| Third Lens (32) | -43.24234202 | -0.073356419 | 0.025117551 | -0.049841005 |
| Fourth Lens (41) | 0 | 0.259085061 | -0.095995446 | 0.009186869 |
| Fourth Lens (42) | -2.343924648 | 0.089021987 | -0.019592414 | 0.002137343 |
| Fifth Lens (51) | -4.818596985 | -0.045803667 | 0.004760541 | 0.000458829 |
| Fifth Lens (52) | -4.416006702 | -0.032148688 | 0.004377024 | -0.000354115 |
| No. | a10 | a12 | a14 | a16 |
| First Lens (11) | 0.001313493 | 0 | 0 | 0 |
| First Lens (12) | 0.002021171 | 0 | 0 | 0 |
| Second Lens (21) | -0.083256762 | 0.029190804 | 0 | 0 |
| Second Lens (22) | -0.126391301 | 0.040211461 | 0 | 0 |
| Third Lens (31) | 0.026332514 | 0.010054471 | -0.01135058 | 0 |
| Third Lens (32) | 0.00215859 | 0.011494162 | -0.002912152 | 0 |
| Fourth Lens (41) | 0.001462882 | 0.00152635 | -0.00089057 | 0.00022121 |
| Fourth Lens (42) | -0.001089811 | -0.000274931 | 0.000198913 | -1.89494E-05 |
| Fifth Lens (51) | -4.69218E-05 | -1.15857E-05 | -1.40216E-06 | 4.17348E-07 |
| Fifth Lens (52) | -4.22231E-06 | 2.81851E-06 | -3.16884E-08 | -1.00144E-08 |

FIG. 25

| Fifth Example | | | | | | |
|---|---|---|---|---|---|---|
| EFL(Effective Focal Length)= 4.143 mm., HFOV(Half Field Of View)= 35.91 deg., Total Length=5.417mm., Fno= 2.28 | | | | | | |
| No. | | Curvature Radius | Ape. Stop Distance Lens Thickness Air Gap | Refractive Index | Abbe No. | Focal Length | Material |
| | Object | infinity | infinity | | | | |
| 11 | First Lens | 1.8118 | 0.6807 | 1.5441 | 56.1143 | 3.5399 | Plastic |
| 12 | | 25.1364 | 0.0522 | 0.0000 | 0.0000 | 0.0000 | |
| 80 | Ape. Stop | infinity | 0.0692 | 0.0000 | 0.0000 | 0.0000 | |
| 21 | Second Lens | 10.4222 | 0.2404 | 1.6397 | 23.5288 | -5.5693 | Plastic |
| 22 | | 2.6460 | 0.3413 | | | | |
| 31 | Third Lens | -22.0315 | 0.4437 | 1.5441 | 56.1143 | 9.0963 | Plastic |
| 32 | | -4.0814 | 0.4480 | | | | |
| 41 | Fourth Lens | -1.5121 | 0.5843 | 1.5441 | 56.1143 | 6.7047 | Plastic |
| 42 | | -1.2160 | 0.1303 | | | | |
| 51 | Fifth Lens | 2.8819 | 0.9238 | 1.5311 | 55.7441 | -6.0050 | Plastic |
| 52 | | 1.3473 | 0.7035 | | | | |
| 72 | Filter | infinity | 0.3000 | | | | |
| | | infinity | 0.4999 | | | | |
| 71 | Image Plane | infinity | 0.0000 | | | | |

FIG. 26

| No. | K | a4 | a6 | a8 |
|---|---|---|---|---|
| First Lens (11) | 0 | 0.013027586 | 0.001601618 | 0.006247686 |
| First Lens (12) | 0 | 0.03467182 | -0.00917846 | 0.018605698 |
| Second Lens (21) | 0 | -0.001681875 | -0.055703694 | 0.069212024 |
| Second Lens (22) | 0 | 0.000248643 | -0.082695698 | 0.145198915 |
| Third Lens (31) | 474.504503 | -0.037601071 | -0.032646948 | -0.055832732 |
| Third Lens (32) | -47.37676483 | -0.072104037 | 0.042195432 | -0.068863725 |
| Fourth Lens (41) | 0 | 0.252274064 | -0.091221266 | 0.007296951 |
| Fourth Lens (42) | -1.883533464 | 0.078491406 | -0.023908575 | 0.001375073 |
| Fifth Lens (51) | -10.84941741 | -0.047753287 | 0.003334436 | 0.000759509 |
| Fifth Lens (52) | -6.154740539 | -0.029398416 | 0.003856924 | -0.000400292 |
| No. | a10 | a12 | a14 | a16 |
| First Lens (11) | 0.004447013 | 0 | 0 | 0 |
| First Lens (12) | -0.017595352 | 0 | 0 | 0 |
| Second Lens (21) | -0.040980412 | -0.019729216 | 0 | 0 |
| Second Lens (22) | -0.102306967 | 0.017825956 | 0 | 0 |
| Third Lens (31) | 0.058103787 | -0.005957035 | 0.009668161 | 0 |
| Third Lens (32) | -0.021364766 | 0.037794606 | -0.002840558 | 0 |
| Fourth Lens (41) | -0.001001564 | 0.001275556 | -0.000744982 | 0.000840984 |
| Fourth Lens (42) | -0.001030724 | -7.65255E-05 | 0.000112128 | 2.92699E-05 |
| Fifth Lens (51) | 1.46859E-05 | -8.83514E-06 | -2.23073E-06 | 2.68226E-07 |
| Fifth Lens (52) | -6.46053E-06 | 3.55286E-06 | 1.64746E-07 | -2.47292E-08 |

FIG. 27

| | Sixth Example | | | | | |
|---|---|---|---|---|---|---|
| | EFL(Effective Focal Length)= 4.071 mm., HFOV(Half Field Of View)= 36.38 deg., Total Length=5.083mm., Fno= 2.119 | | | | | |
| No. | | Curvature Radius | Ape. Stop Distance Lens Thickness Air Gap | Refractive Index | Abbe No. | Focal Length | Material |
| | Object | infinity | infinity | | | | |
| 11 | First Lens | 1.8814 | 0.6812 | 1.5441 | 56.1143 | 2.8042 | Plastic |
| 12 | | -7.1668 | 0.0308 | | | | |
| 80 | Ape. Stop | infinity | 0.0712 | | | | |
| 21 | Second Lens | -7.7590 | 0.2457 | 1.6397 | 23.5288 | -3.6220 | Plastic |
| 22 | | 3.3811 | 0.2969 | | | | |
| 31 | Third Lens | 4.6889 | 0.4787 | 1.5441 | 56.1143 | 7.0125 | Plastic |
| 32 | | -20.1091 | 0.5896 | | | | |
| 41 | Fourth Lens | -1.4799 | 0.5722 | 1.5441 | 56.1143 | 3.8065 | Plastic |
| 42 | | -0.9824 | 0.1673 | | | | |
| 51 | Fifth Lens | 3.1118 | 0.5152 | 1.5311 | 55.7441 | -3.2015 | Plastic |
| 52 | | 1.0385 | 0.6344 | | | | |
| 72 | Filter | infinity | 0.3000 | | | | |
| | | infinity | 0.4999 | | | | |
| 71 | Image Plane | infinity | 0.0000 | | | | |

FIG. 28

| No. | K | a4 | a6 | a8 |
|---|---|---|---|---|
| First Lens (11) | 0 | -0.013744041 | -0.005055835 | -0.013006509 |
| First Lens (12) | 0 | 0.067706734 | -0.0849764 | 0.047961772 |
| Second Lens (21) | 0 | 0.112117312 | 0.003251188 | -0.137662168 |
| Second Lens (22) | 0 | 0.05889069 | -0.097972731 | 0.167726951 |
| Third Lens (31) | 18.88297876 | -0.072143651 | -0.398009789 | 1.057500617 |
| Third Lens (32) | 299.7221498 | -0.092725608 | 0.180321998 | -0.732206525 |
| Fourth Lens (41) | 0 | 0.125872306 | -0.450864142 | 0.617140621 |
| Fourth Lens (42) | -0.890916491 | 0.175341522 | -0.230939397 | 0.132277252 |
| Fifth Lens (51) | 0.984243673 | -0.189267882 | 0.049123466 | 0.002897519 |
| Fifth Lens (52) | -5.129206482 | -0.091331615 | 0.033499475 | -0.009551236 |
| No. | a10 | a12 | a14 | a16 |
| First Lens (11) | -0.001685188 | 0 | 0 | 0 |
| First Lens (12) | -0.01490976 | 0 | 0 | 0 |
| Second Lens (21) | 0.214808325 | -0.095027579 | 0 | 0 |
| Second Lens (22) | -0.115717501 | 0.029257801 | 0 | 0 |
| Third Lens (31) | -1.622327958 | 1.104012255 | -0.279422039 | 0 |
| Third Lens (32) | 1.156587512 | -0.92677174 | 0.29493611 | 0 |
| Fourth Lens (41) | -0.391382767 | 0.031382904 | 0.083925637 | -0.026067037 |
| Fourth Lens (42) | 0.005217355 | -0.024609924 | 0.006148048 | -0.000277538 |
| Fifth Lens (51) | -0.003699559 | -0.000306721 | 0.00032256 | -3.57907E-05 |
| Fifth Lens (52) | 0.001875234 | -0.00023954 | 1.40467E-05 | -3.66257E-08 |

FIG. 29

| Seventh Example |||||||
|---|---|---|---|---|---|---|
| EFL(Effective Focal Length)= 4.110 mm., HFOV(Half Field Of View)= 36.12 deg., |||||||
| Total Length=5.537mm., Fno= 2.24 |||||||
| No. | | Curvature Radius | Ape. Stop Distance Lens Thickness Air Gap | Refractive Index | Abbe No. | Focal Length | Material |
| | Object | infinity | infinity | | | | |
| 11 | First Lens | 2.8015 | 0.6313 | 1.5441 | 56.1143 | 3.3956 | Plastic |
| 12 | | -5.0439 | 0.0203 | | | | |
| 80 | Ape. Stop | infinity | 0.1028 | | | | |
| 21 | Second Lens | 3.0959 | 0.2662 | 1.6397 | 23.5288 | -4.0761 | Plastic |
| 22 | | 1.3733 | 0.3868 | | | | |
| 31 | Third Lens | 7.0308 | 0.5298 | 1.5441 | 56.1143 | 7.2570 | Plastic |
| 32 | | -8.8350 | 0.6493 | | | | |
| 41 | Fourth Lens | -1.5767 | 0.5045 | 1.5441 | 56.1143 | 3.9160 | Plastic |
| 42 | | -1.0100 | 0.1667 | | | | |
| 51 | Fifth Lens | 5.3369 | 0.8435 | 1.5311 | 55.7441 | -3.7654 | Plastic |
| 52 | | 1.3781 | 0.6357 | | | | |
| 72 | Filter | infinity | 0.3000 | | | | |
| | | infinity | 0.4998 | | | | |
| 71 | Image Plane | infinity | 0.0000 | | | | |

FIG. 30

| No. | K | a4 | a6 | a8 |
|---|---|---|---|---|
| First Lens (11) | 0 | 0.001196566 | -0.019597094 | 0.013352019 |
| First Lens (12) | 0 | 0.05253253 | -0.031829906 | 0.009327586 |
| Second Lens (21) | 0 | -0.146919874 | 0.184587141 | -0.161259899 |
| Second Lens (22) | 0 | -0.269796536 | 0.21628405 | -0.190342144 |
| Third Lens (31) | 2.982234072 | -0.02814521 | -0.050946202 | 0.068921917 |
| Third Lens (32) | 0.074046727 | -0.006141741 | -0.015041208 | -0.044546916 |
| Fourth Lens (41) | 0 | 0.089853169 | -0.048853398 | 0.081191526 |
| Fourth Lens (42) | -2.20009607 | -0.022334289 | -0.009993257 | 0.021019123 |
| Fifth Lens (51) | 2.917878412 | -0.068210775 | 0.013951525 | -0.000395655 |
| Fifth Lens (52) | -6.968219515 | -0.041932524 | 0.009716416 | -0.002005392 |
| No. | a10 | a12 | a14 | a16 |
| First Lens (11) | -0.005495934 | 0 | 0 | 0 |
| First Lens (12) | -0.002668315 | 0 | 0 | 0 |
| Second Lens (21) | 0.068787152 | -0.00737666 | 0 | 0 |
| Second Lens (22) | 0.080493868 | -0.019534529 | 0 | 0 |
| Third Lens (31) | -0.111618711 | 0.051854429 | -0.008332016 | 0 |
| Third Lens (32) | 0.043381443 | -0.040526527 | 0.014939277 | 0 |
| Fourth Lens (41) | -0.043294135 | -0.005493862 | 0.013716828 | -0.003347455 |
| Fourth Lens (42) | 0.00320369 | -0.001573254 | -0.00095531 | 0.000240005 |
| Fifth Lens (51) | -0.000257537 | 1.96555E-05 | 2.73835E-06 | -3.12875E-07 |
| Fifth Lens (52) | 0.000202042 | 2.89386E-06 | -2.58008E-06 | 1.61333E-07 |

FIG. 31

|  | Example 1 | Example 2 | Example 3 | Example 4 | Example 5 | Example 6 | Example 7 |
|---|---|---|---|---|---|---|---|
| AAG/T3 | 1.929 | 1.884 | 2.917 | 1.652 | 2.346 | 2.414 | 2.503 |
| BFL/T1 | 2.170 | 2.166 | 2.455 | 3.128 | 2.209 | 2.105 | 2.274 |
| T2/AG12+45 | 1.982 | 1.962 | 1.166 | 1.522 | 0.955 | 0.912 | 0.919 |
| T2/AG23 | 1.586 | 1.555 | 0.733 | 0.685 | 0.704 | 0.828 | 0.688 |
| T5/AG34 | 1.948 | 1.945 | 1.751 | 1.522 | 2.062 | 0.874 | 1.299 |
| T5/T4 | 2.162 | 2.241 | 1.565 | 1.085 | 1.581 | 0.900 | 1.672 |
| AAG/T5 | 0.926 | 0.927 | 1.159 | 1.558 | 1.127 | 2.243 | 1.572 |
| T5/AG12+45 | 5.448 | 5.482 | 4.403 | 3.574 | 3.670 | 1.913 | 2.910 |
| BFL/AG12+45 | 8.216 | 8.186 | 7.654 | 10.765 | 5.974 | 5.326 | 4.953 |
| BFL/T2 | 4.145 | 4.171 | 6.565 | 7.072 | 6.253 | 5.838 | 5.393 |
| T1/T4 | 1.503 | 1.545 | 1.108 | 1.045 | 1.165 | 1.191 | 1.251 |
| AAG/T1 | 1.333 | 1.344 | 1.637 | 1.618 | 1.529 | 1.697 | 2.100 |
| T1/AG12+45 | 3.787 | 3.779 | 3.118 | 3.442 | 2.705 | 2.530 | 2.178 |
| T1/AG23 | 3.030 | 2.995 | 1.961 | 1.550 | 1.994 | 2.295 | 1.632 |
| T3/AG12+45 | 1.982 | 1.962 | 1.166 | 1.522 | 0.955 | 0.912 | 0.919 |
| ALT/BFL | 1.990 | 1.999 | 1.731 | 1.412 | 1.911 | 1.738 | 1.933 |
| T3/T4 | 1.038 | 1.102 | 0.622 | 1.023 | 0.759 | 0.837 | 1.050 |

FIG. 32

OPTICAL IMAGING LENS AND ELECTRONIC DEVICE COMPRISING THE SAME

CROSS REFERENCE TO RELATED APPLICATION

This application claims priority to Chinese Application No. 201410153384.0, filed on Apr. 16, 2014, the contents of which are hereby incorporated by reference in their entirety for all purposes.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of five lens elements and an electronic device which includes such optical imaging lens set of five lens elements.

2. Description of the Prior Art

In recent years, the popularity of mobile phones and digital cameras makes the sizes of various portable electronic products reduce quickly, and so does the size of the photography modules. The current trend of research is to develop an optical imaging lens set of a shorter length with uncompromised good quality. The most important characteristics of an optical imaging lens set are image quality and size.

U.S. Pat. No. 7,480,105, U.S. Pat. No. 7,639,432, U.S. Pat. No. 7,486,449 and U.S. Pat. No. 7,684,127 disclose an optical imaging lens set of five lens elements. However, in U.S. Pat. No. 7,480,105 and U.S. Pat. No. 7,639,432, the first lens element and the second lens element have negative refractive power and with positive refractive power respectively; in U.S. Pat. No. 7,486,449 and U.S. Pat. No. 7,684,127, both the first lens element and the second lens element have negative refractive power. This arrangement cannot achieve good optical performance. Besides, in those four patents, the total length of the optical imaging lens set is between 10~18 mm, and the size of the optical imaging lens set is too big to satisfy the specification requirements of consumer electronics products.

Therefore, how to reduce the total length of a photographic device, but still maintain good optical performance, is an important research objective.

SUMMARY OF THE INVENTION

In the light of the above, the present invention is capable of proposing an optical imaging lens set that is lightweight, and has a low production cost, reduced length, high resolution and high image quality. The optical imaging lens set of five lens elements of the present invention has a first lens element, an aperture stop, a second lens element, a third lens element, a fourth lens element and a fifth lens element sequentially from an object side to an image side along an optical axis.

An optical imaging lens includes: a first, second, third, fourth and fifth lens element, the first lens element has positive refractive power, having an object-side surface with a convex part in a vicinity of the optical axis, and a convex part in a vicinity of its periphery; the second lens element has negative refractive power, having an object-side surface with a convex part in a vicinity of its periphery; the third lens element has positive refractive power, having an object-side surface with a concave part in a vicinity of its periphery; the fourth lens element has positive refractive power, having an object-side surface with a concave part in a vicinity of its periphery, and an image-side surface with a convex part in a vicinity of the optical axis; the fifth lens element has negative refractive power, having an image-side surface with a concave part in a vicinity of the optical axis and a convex part in a vicinity of its periphery, wherein the optical imaging lens set does not include any lens element with refractive power other than said first, second, third, fourth and fifth lens elements.

In the optical imaging lens set of five lens elements of the present invention, an air gap AG12 along the optical axis is disposed between the first lens element and the second lens element, an air gap AG23 along the optical axis is disposed between the second lens element and the third lens element, an air gap AG34 along the optical axis is disposed between the third lens element and the fourth lens element, an air gap AG45 along the optical axis is disposed between the fourth lens element and the fifth lens element, and the sum of total four air gaps between adjacent lens elements from the first lens element to the fifth lens element along the optical axis is AAG, AAG=AG12+AG23+AG34+AG45.

In the optical imaging lens set of five lens elements of the present invention, the first lens element has a first lens element thickness T1 along the optical axis, the second lens element has a second lens element thickness T2 along the optical axis, the third lens element has a third lens element thickness T3 along the optical axis, the fourth lens element has a fourth lens element thickness T4 along the optical axis, the fifth lens element has a fifth lens element thickness T5 along the optical axis, and the total thickness of all the lens elements in the optical imaging lens set along the optical axis is ALT, ALT=T1+T2+T3+T4+T5. In addition, the distance between the image-side surface of the fifth lens element to an image plane along the optical axis is BFL (back focal length). Besides, the total length of the optical imaging lens set is TTL, in other words, the distance between the first object-side surface of the first lens element to the image plane along the optical axis is TTL.

In the optical imaging lens set of five lens elements of the present invention, the relationship $AAG/T3 \leq 3.0$ is satisfied.

In the optical imaging lens set of five lens elements of the present invention, the relationship $BFL/T1 \leq 3.3$ is satisfied.

In the optical imaging lens set of five lens elements of the present invention, the relationship $AAG/T5 \leq 2.5$ is satisfied.

In the optical imaging lens set of five lens elements of the present invention, the relationship $1.5 \leq T5/(AG12+AG45)$ is satisfied.

In the optical imaging lens set of five lens elements of the present invention, the relationship $4.5 \leq BFL/(AG12+AG45)$ is satisfied.

In the optical imaging lens set of five lens elements of the present invention, the relationship $0.9 \leq T2/(AG12+AG45)$ is satisfied.

In the optical imaging lens set of five lens elements of the present invention, the relationship $BFL/T2 \leq 6.6$ is satisfied.

In the optical imaging lens set of five lens elements of the present invention, the relationship $1.0 \leq T1/T4$ is satisfied.

In the optical imaging lens set of five lens elements of the present invention, the relationship $0.65 \leq T2/AG23$ is satisfied.

In the optical imaging lens set of five lens elements of the present invention, the relationship $AAG/T1 \leq 2.2$ is satisfied.

In the optical imaging lens set of five lens elements of the present invention, the relationship $2.0 \leq T1/(AG12+AG45)$ is satisfied.

In the optical imaging lens set of five lens elements of the present invention, the relationship 0.8≤T5/AG34 is satisfied.

In the optical imaging lens set of five lens elements of the present invention, the relationship 1.5≤T1/AG23 is satisfied.

In the optical imaging lens set of five lens elements of the present invention, the relationship 0.9≤T3/(AG12+AG45) is satisfied.

In the optical imaging lens set of five lens elements of the present invention, the relationship 0.9≤T5/T4 is satisfied.

In the optical imaging lens set of five lens elements of the present invention, the relationship 1.4≤ALT/BFL is satisfied.

In the optical imaging lens set of five lens elements of the present invention, the relationship 0.75≤T3/T4 is satisfied.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 18 shows the optical data of the first example of the optical imaging lens set.

FIG. 19 shows the aspheric surface data of the first example.

FIG. 20 shows the optical data of the second example of the optical imaging lens set.

FIG. 21 shows the aspheric surface data of the second example.

FIG. 22 shows the optical data of the third example of the optical imaging lens set.

FIG. 23 shows the aspheric surface data of the third example.

FIG. 24 shows the optical data of the fourth example of the optical imaging lens set.

FIG. 25 shows the aspheric surface data of the fourth example.

FIG. 26 shows the optical data of the fifth example of the optical imaging lens set.

FIG. 27 shows the aspheric surface data of the fifth example.

FIG. 28 shows the optical data of the sixth example of the optical imaging lens set.

FIG. 29 shows the aspheric surface data of the sixth example.

FIG. 30 shows the optical data of the seventh example of the optical imaging lens set.

FIG. 31 shows the aspheric surface data of the seventh example.

FIG. 32 shows some important ratios in the examples.

DETAILED DESCRIPTION

Figure 15:
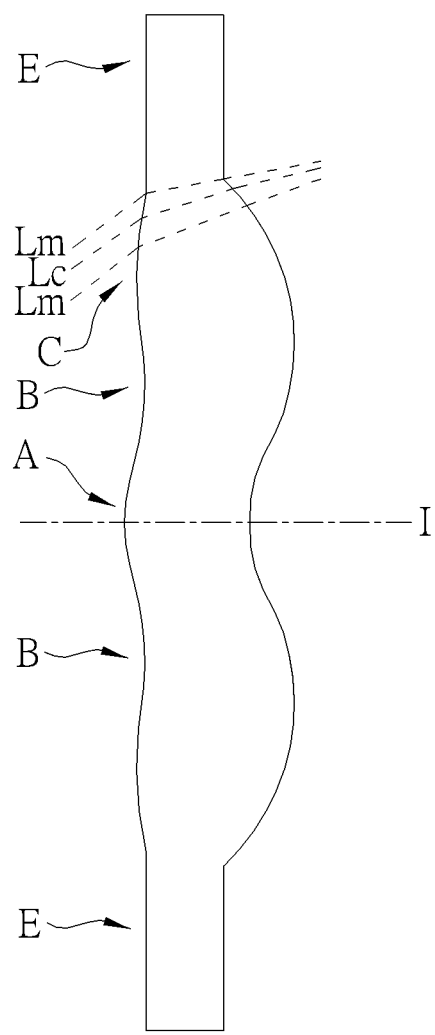
FIG. 15 illustrates exemplificative shapes of the optical imaging lens element of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power. "An object-side/image-side surface of a certain lens element has a concave/convex part" refers to the part is more concave/convex in a direction parallel with the optical axis to be compared with an outer region next to the region. Taking FIG. 15 for example, the optical axis is "I" and the lens element is symmetrical with respect to the optical axis I. The object side of the lens element has a convex part in the region A, a concave part in the region B, and a convex part in the region C because region A is more convex in a direction parallel with the optical axis than an outer region (region B) next to region A, region B is more concave than region C and region C is similarly more convex than region E. "A circular periphery of a certain lens element" refers to a circular periphery region of a surface on the lens element for light to pass through, that is, region C in the drawing. In the drawing, imaging light includes Lc (chief ray) and Lm (marginal ray). "A vicinity of the optical axis" refers to an optical axis region of a surface on the lens element for light to pass through, that is, the region A in FIG. 15. In addition, the lens element may include an extension part E for the lens element to be installed in an optical imaging lens set. Ideally speaking, no light would pass through the extension part, and the actual structure and shape of the extension part is not limited to this and may have other variations. For the reason of simplicity, the extension part is not illustrated in FIGS. 1, 3, 5, 7, 9, 11 and 13.

Figure 1:
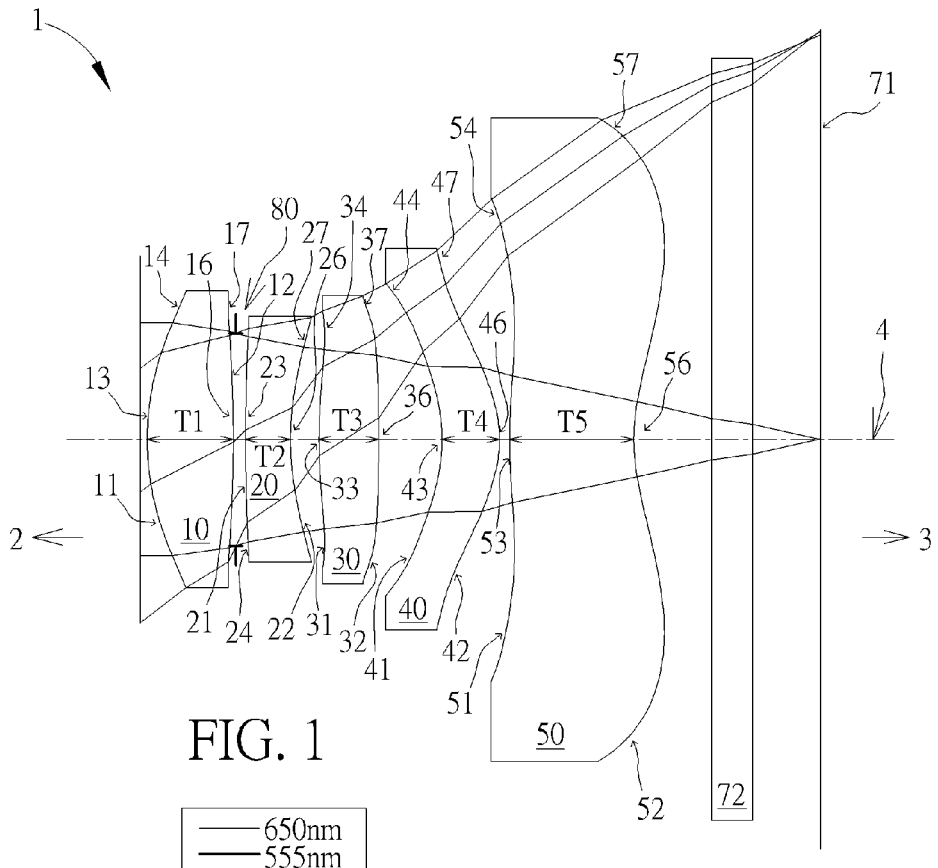
FIG. 1 illustrates a first example of the optical imaging lens set of the present invention.

As shown in FIG. 1, the optical imaging lens set 1 of five lens elements of the present invention, sequentially from an object side 2 (where an object is located) to an image side 3 along an optical axis 4, has a first lens element 10, an aperture stop 80, a second lens element 20, a third lens element 30, a fourth lens element 40, a fifth lens element 50, a filter 72 and an image plane 71. Generally speaking, the first lens element 10, the second lens element 20, the third lens element 30, the fourth lens element 40 and the fifth lens element 50 may be made of a transparent plastic material and each has an appropriate refractive power, but the present invention is not limited to this. There are exclusively five lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed between the first lens element 10 and the second lens element 20. When light emitted or reflected by an object (not shown) which is located at the object side 2 enters the optical imaging lens set 1 of the present invention, it forms a clear and sharp image on the image plane 71 at the image side 3 after passing through the first lens element 10, the aperture stop 80, the second lens element 20, the third lens element 30, the fourth lens element 40, the fifth lens element 50 and the filter 72.

In the embodiments of the present invention, the optional filter 72 may be a filter of various suitable functions, for example, the filter 72 may be an infrared cut filter (IR cut filter), placed between the fifth lens element 50 and the image plane 71.

Each lens element in the optical imaging lens set 1 of the present invention has an object-side surface facing toward the object side 2 as well as an image-side surface facing toward the image side 3. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) close to the optical axis 4. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; the fifth lens element 50 has a fifth object-side surface 51 and a fifth image-side surface 52.

Each lens element in the optical imaging lens set 1 of the present invention further has a central thickness on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, and the fifth lens element 50 has a fifth lens element thickness T5. Therefore, the total thickness of all the lens elements in the optical imaging lens set 1 along the optical axis 4 is ALT, ALT=T1+T2+T3+T4+T5.

In addition, between two adjacent lens elements in the optical imaging lens set 1 of the present invention there is an air gap along the optical axis 4. For example, an air gap G12 is disposed between the first lens element 10 and the second lens element 20, an air gap G23 is disposed between the second lens element 20 and the third lens element 30, an air gap G34 is disposed between the third lens element 30 and the fourth lens element 40, and an air gap G45 is disposed between the fourth lens element 40 and the fifth lens element 50. Therefore, the sum of total four air gaps between adjacent lens elements from the first lens element 10 to the fifth lens element 50 along the optical axis 4 is AAG, AAG=G12+G23+G34+G45.

Besides, the total length of the optical imaging lens set is TTL, in other words, the distance between the first object-side surface 11 of the first lens element 10 to the image plane 71 along the optical axis 4 is TTL; the distance between the fifth image-side surface 52 of the fifth lens element 50 to the image plane 71 along the optical axis 4 is BFL.

First Example

Figures 2A, 2B, 2C, 2D:
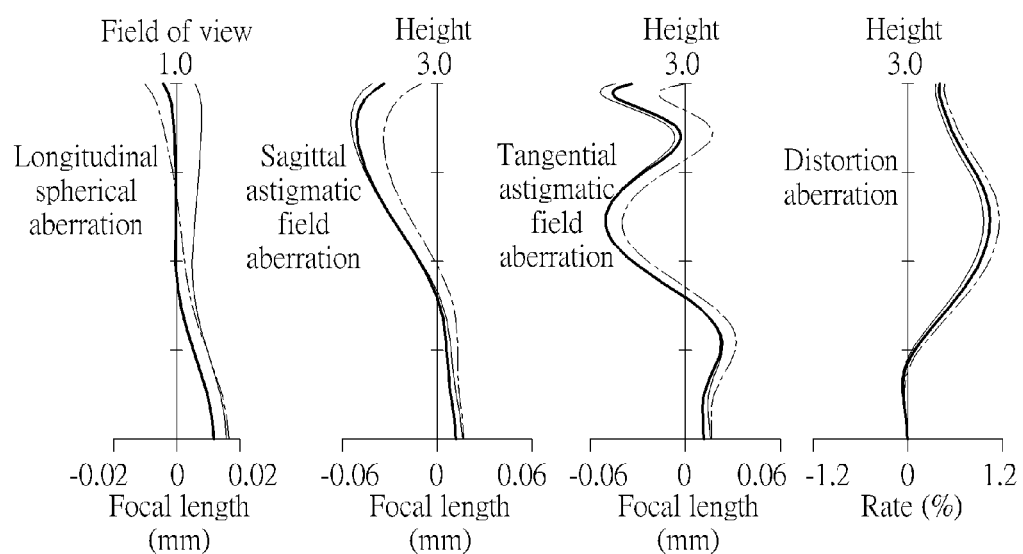
FIG. 2A illustrates the longitudinal spherical aberration on the image plane of the first example.
FIG. 2B illustrates the astigmatic aberration on the sagittal direction of the first example.
FIG. 2C illustrates the astigmatic aberration on the tangential direction of the first example.
FIG. 2D illustrates the distortion aberration of the first example.

Please refer to FIG. 1 which illustrates the first example of the optical imaging lens set 1 of the present invention. Please refer to FIG. 2A for the longitudinal spherical aberration on the image plane 71 of the first example; please refer to FIG. 2B for the astigmatic field aberration on the sagittal direction; please refer to FIG. 2C for the astigmatic field aberration on the tangential direction, and please refer to FIG. 2D for the distortion aberration. The Y axis of the spherical aberration in each example is "field of view" for 1.0. The Y axis of the astigmatic field and the distortion in each example stand for "image height", the image height is 3.0 mm.

The optical imaging lens set 1 of the first example has five lens elements 10,20,30,40 and 50, and all of the lens elements are made of a plastic material and have refractive power. The optical imaging lens set 1 also has an aperture stop 80, a filter 72, and an image plane 71. The aperture stop 80 is provided between the first lens element 10 and the second lens element 20. The filter 72 may be an infrared filter (IR cut filter) to prevent inevitable infrared light from reaching the image plane to adversely affect the imaging quality.

The first lens element 10 has positive refractive power. The first object-side surface 11 facing toward the object side 2 is a convex surface, having a convex part 13 in the vicinity of the optical axis and a convex part 14 in a vicinity of its circular periphery; The first image-side surface 12 facing toward the image side 3 is a convex surface, having a convex part 16 in the vicinity of the optical axis and a convex part 17 in a vicinity of its circular periphery.

The second lens element 20 has negative refractive power. The second object-side surface 21 facing toward the object side 2 has a convex part 23 in the vicinity of the optical axis and a convex part 24 in a vicinity of its circular periphery; The second image-side surface 22 facing toward the image side 3 has a concave part 26 in the vicinity of the optical axis and a concave part 27 in a vicinity of its circular periphery.

The third lens element 30 has positive refractive power. The third object-side surface 31 facing toward the object side 2 has a convex part 33 in the vicinity of the optical axis and a concave part 34 in a vicinity of its circular periphery; The third image-side surface 32 facing toward the image side 3 is a convex surface, having a convex part 36 in the vicinity of the optical axis and a convex part 37 in a vicinity of its circular periphery.

The fourth lens element 40 has positive refractive power. The fourth object-side surface 41 facing toward the object side 2 is a concave surface, having a concave part 43 in the vicinity of the optical axis and a concave part 44 in a vicinity of its circular periphery; The fourth image-side surface 42 facing toward the image side 3 is a convex surface, having a convex part 46 in the vicinity of the optical axis and a convex part 47 in a vicinity of its circular periphery.

The fifth lens element 50 has negative refractive power, a fifth object-side surface 51 facing toward the object side 2 has a convex part 53 in the vicinity of the optical axis and a concave part 54 in a vicinity of its circular periphery. The fifth image-side surface 52 facing toward the image side 3 has a concave part 56 in the vicinity of the optical axis and a convex part 57 in a vicinity of its circular periphery. The filter 72 may be an infrared cut filter, and is disposed between the fifth lens element 50 and the image plane 71.

In the optical imaging lens element 1 of the present invention, the object-side surfaces 11/21/31/41/51 and image-side surfaces 12/22/32/42/52 are all aspherical. These aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant; and $a_{2i}$ is the aspheric coefficient of the 2i order.

The optical data of the first example of the optical imaging lens set 1 are shown in FIG. 18 while the aspheric surface data are shown in FIG. 19. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set (the distance from the first object-side surface 11 of the first lens element 10 to the image plane 71) is 4.950 mm. The image height is 3.0 mm, HFOV is 37.51 degrees. Some important ratios of this example are as follows:

AAG/T3=1.929
BFL/T1=2.170
T2/(AG12+AG45)=1.982
T2/AG23=1.586
T5/AG34=1.948
T5/T4=2.162
AAG/T5=0.926
T5/(AG12+AG45)=5.448
BFL/(AG12+AG45)=8.216
BFL/T2=4.145
T1/T4=1.503
AAG/T1=1.333
T1/(AG12+AG45)=3.787
T1/AG23=3.030
T3/(AG12+AG45)=1.982
ALT/BFL=1.990
T3/T4=1.038

Second Example

Figure 3:
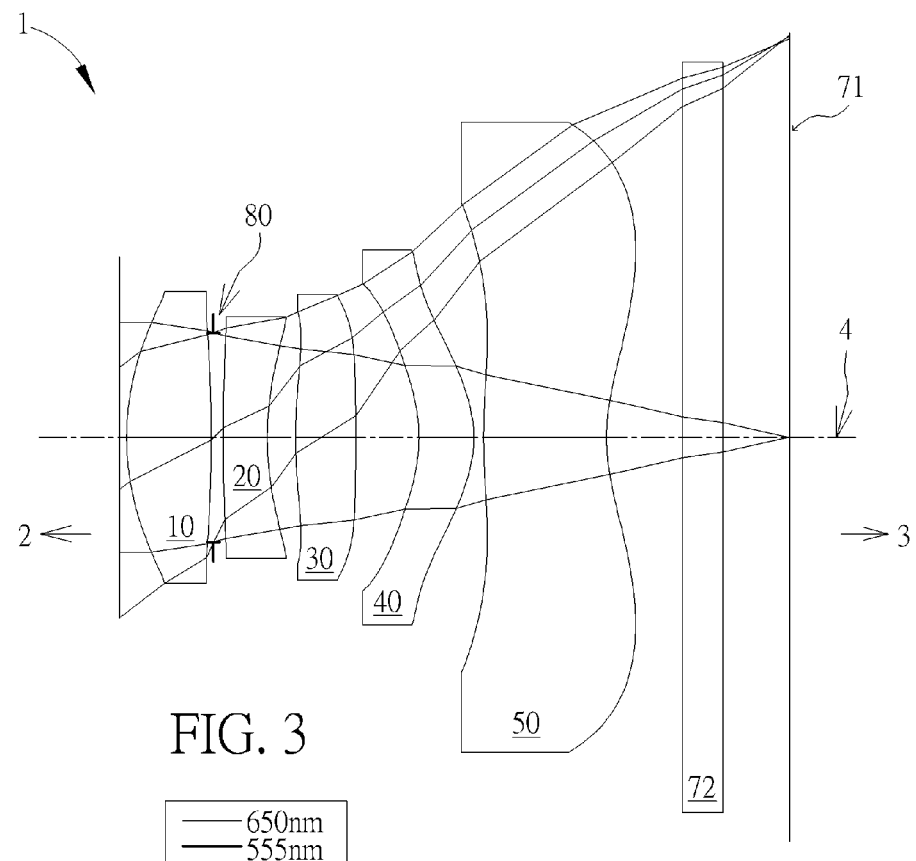
FIG. 3 illustrates a second example of the optical imaging lens set of five lens elements of the present invention.
Figures 4A, 4B, 4C, 4D:
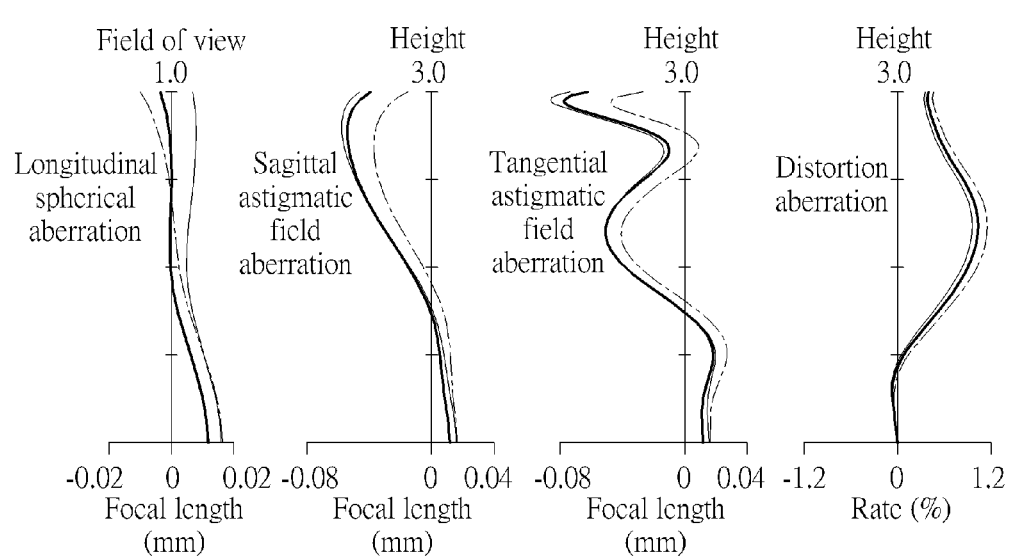
FIG. 4A illustrates the longitudinal spherical aberration on the image plane of the second example.
FIG. 4B illustrates the astigmatic aberration on the sagittal direction of the second example.
FIG. 4C illustrates the astigmatic aberration on the tangential direction of the second example.
FIG. 4D illustrates the distortion aberration of the second example.

Please refer to FIG. 3 which illustrates the second example of the optical imaging lens set 1 of the present invention. It is worth noting that from the second example to the following examples, in order to simplify the figures, only the components different from what the first example has and the basic lens elements will be labeled in figures. Others components that are the same as what the first example has, such as the object-side surface, the image-side surface, the part in the vicinity of the optical axis and the part in a vicinity of its circular periphery will be omitted in the following example. Please refer to FIG. 4A for the longitudinal spherical aberration on the image plane 71 of the second example; please refer to FIG. 4B for the astigmatic aberration on the sagittal direction; please refer to FIG. 4C for the astigmatic aberration on the tangential direction, and please refer to FIG. 4D for the distortion aberration. The components in the second example are similar to those in the first example, but the optical data such as the curvature radius, the refractive power, the lens thickness, the lens focal length, the aspheric surface or the back focal length in this example are different from the optical data in the first example. The optical data of the second example of the optical imaging lens set are shown in FIG. 20 while the aspheric surface data are shown in FIG. 21. The length of the optical imaging lens set is 4.950 mm. The image height is 3.00 mm, HFOV is 37.52 degrees. Some important ratios of this example are as follows:

AAG/T3=1.884
BFL/T1=2.166
T2/(AG12+AG45)=1.962
T2/AG23=1.555
T5/AG34=1.945
T5/T4=2.241
AAG/T5=0.927
T5/(AG12+AG45)=5.482
BFL/(AG12+AG45)=8.186
BFL/T2=4.171
T1/T4=1.545
AAG/T1=1.344
T1/(AG12+AG45)=3.779
T1/AG23=2.995
T3/(AG12+AG45)=1.962
ALT/BFL=1.999
T3/T4=1.102

Third Example

Figure 5:
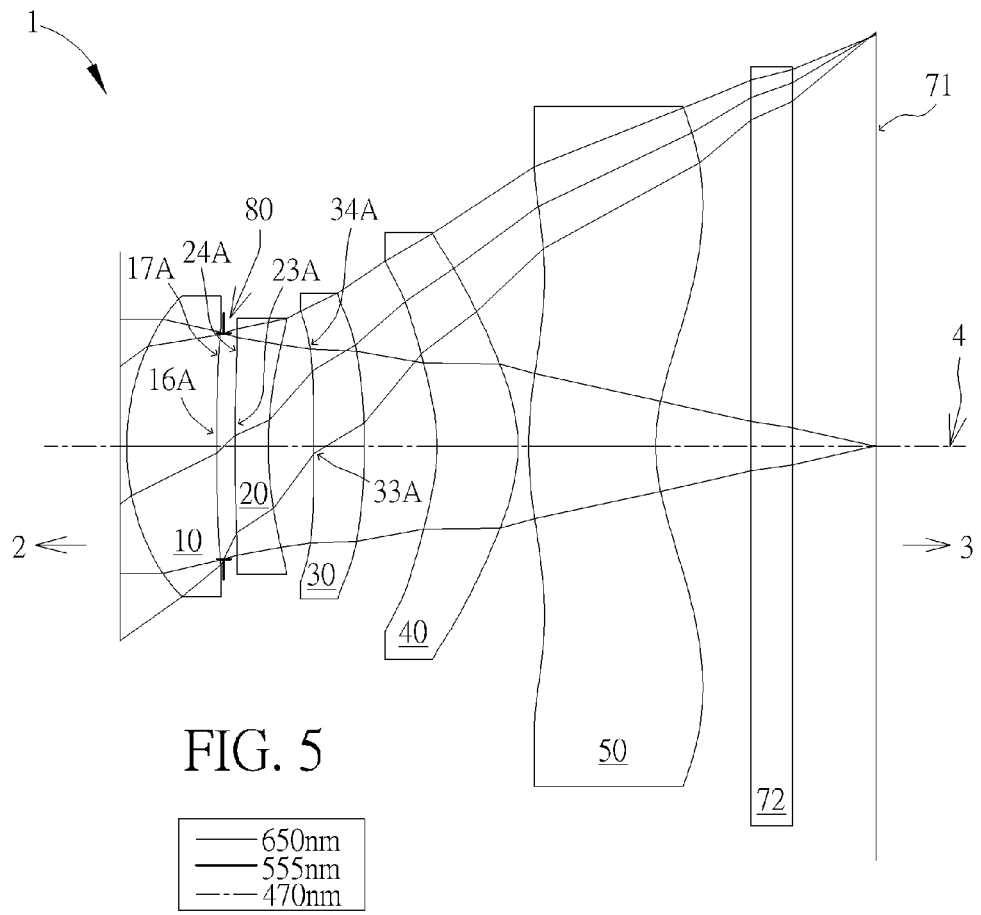
FIG. 5 illustrates a third example of the optical imaging lens set of five lens elements of the present invention.
Figures 6A, 6B, 6C, 6D:
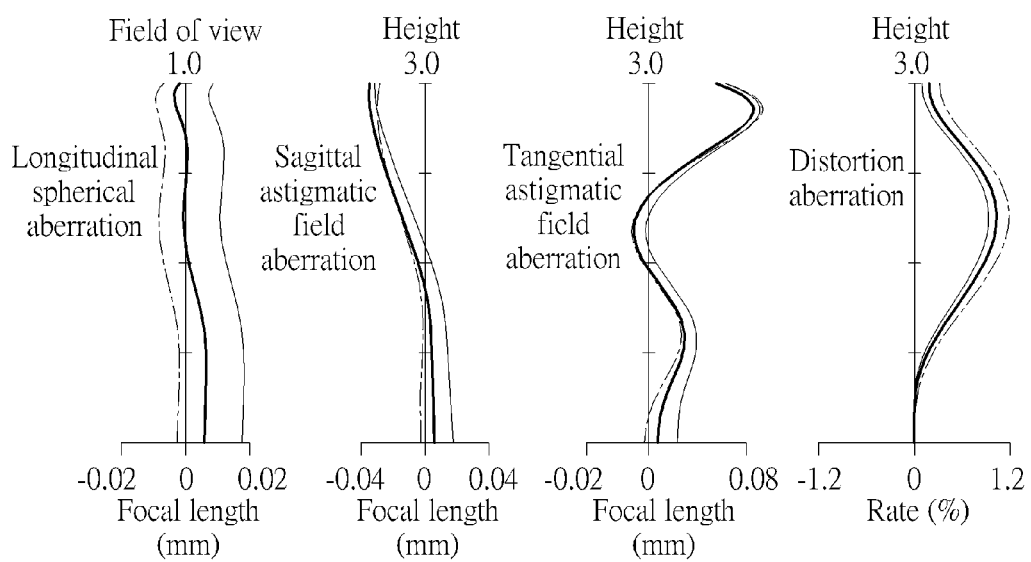
FIG. 6A illustrates the longitudinal spherical aberration on the image plane of the third example.
FIG. 6B illustrates the astigmatic aberration on the sagittal direction of the third example.
FIG. 6C illustrates the astigmatic aberration on the tangential direction of the third example.
FIG. 6D illustrates the distortion aberration of the third example.

Please refer to FIG. 5 which illustrates the third example of the optical imaging lens set 1 of the present invention. Please refer to FIG. 6A for the longitudinal spherical aberration on the image plane 71 of the third example; please refer to FIG. 6B for the astigmatic aberration on the sagittal direction; please refer to FIG. 6C for the astigmatic aberration on the tangential direction, and please refer to FIG. 6D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the first image-side surface 12 of the first lens element 10 is a concave surface, having a concave part 16A in a vicinity of the optical axis, and a concave part 17A in a vicinity of its circular periphery; the second object-side surface 21 of the second lens element 20 has a convex part 23A in a vicinity of the optical axis, and a concave part 24A in a vicinity of its circular periphery; the third object-side surface 31 of the third lens element 30 is a concave surface, having a concave part 33A in a vicinity of the optical axis, and a concave part 34A in a vicinity of its circular periphery. The optical data of the third example of the optical imaging lens set are shown in FIG. 22 while the aspheric surface data are shown in FIG. 23. The length of the optical imaging lens set is 5.440 mm. The image height is 3.0 mm, HFOV is 35.59 degrees. Some important ratios of this example are as follows:
AAG/T3=2.917
BFL/T1=2.455
T2/(AG12+AG45)=1.166
T2/AG23=0.733
T5/AG34=1.751
T5/T4=1.565
AAG/T5=1.159
T5/(AG12+AG45)=4.403
BFL/(AG12+AG45)=7.654
BFL/T2=6.565
T1/T4=1.108
AAG/T1=1.637
T1/(AG12+AG45)=3.118
T1/AG23=1.961
T3/(AG12+AG45)=1.166
ALT/BFL=1.731
T3/T4=0.622

Fourth Example

Figure 7:
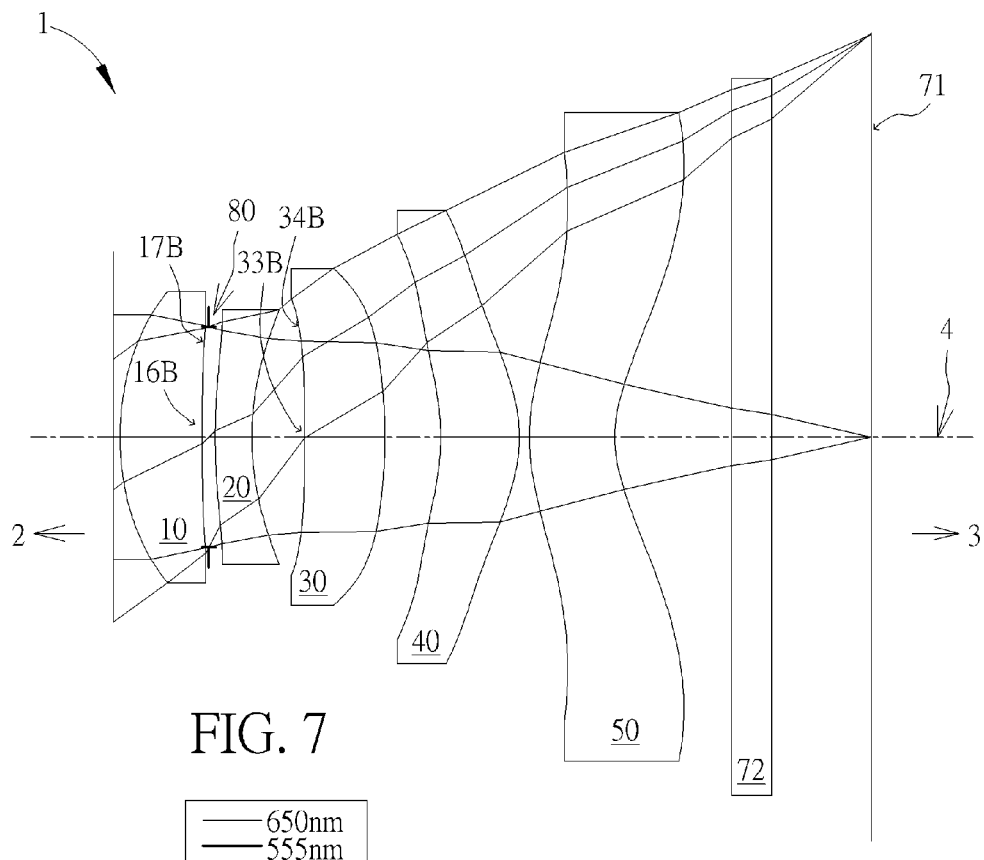
FIG. 7 illustrates a fourth example of the optical imaging lens set of five lens elements of the present invention.
Figures 8A, 8B, 8C, 8D:
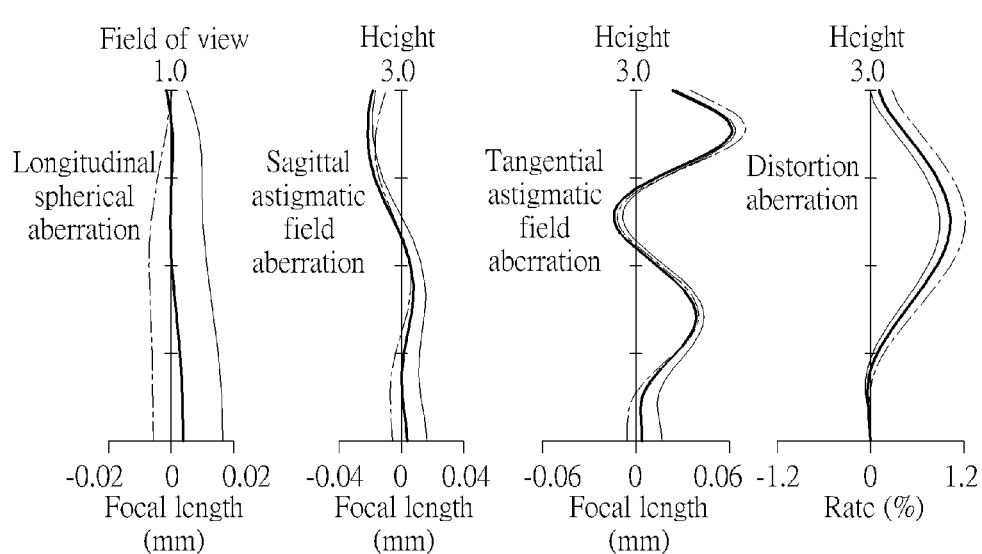
FIG. 8A illustrates the longitudinal spherical aberration on the image plane of the fourth example.
FIG. 8B illustrates the astigmatic aberration on the sagittal direction of the fourth example.
FIG. 8C illustrates the astigmatic aberration on the tangential direction of the fourth example.
FIG. 8D illustrates the distortion aberration of the fourth example.

Please refer to FIG. 7 which illustrates the fourth example of the optical imaging lens set 1 of the present invention. Please refer to FIG. 8A for the longitudinal spherical aberration on the image plane 71 of the fourth example; please refer to FIG. 8B for the astigmatic aberration on the sagittal direction; please refer to FIG. 8C for the astigmatic aberration on the tangential direction, and please refer to FIG. 8D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the first image-side surface 12 of the first lens element 10 is a concave surface, having a concave part 16B in a vicinity of the optical axis, and a concave part 17B in a vicinity of its circular periphery; the third object-side surface 31 of the third lens element 30 is a concave surface, having a concave part 33B in a vicinity of the optical axis, and a concave part 34B in a vicinity of its circular periphery. The optical data of the fourth example of the optical imaging lens set are shown in FIG. 24 while the aspheric surface data are shown in FIG. 25. The length of the optical imaging lens set is 5.591 mm. The image height is 3.0 mm, HFOV is 36.15 degrees. Some important ratios of this example are as follows:
AAG/T3=1.652
BFL/T1=3.128
T2/(AG12+AG45)=1.522
T2/AG23=0.685
T5/AG34=1.522
T5/T4=1.085
AAG/T5=1.558
T5/(AG12+AG45)=3.574
BFL/(AG12+AG45)=10.765
BFL/T2=7.072
T1/T4=1.045
AAG/T1=1.618
T1/(AG12+AG45)=3.442
T1/AG23=1.550
T3/(AG12+AG45)=1.522
ALT/BFL=1.412
T3/T4=1.023

Fifth Example

Figure 9:
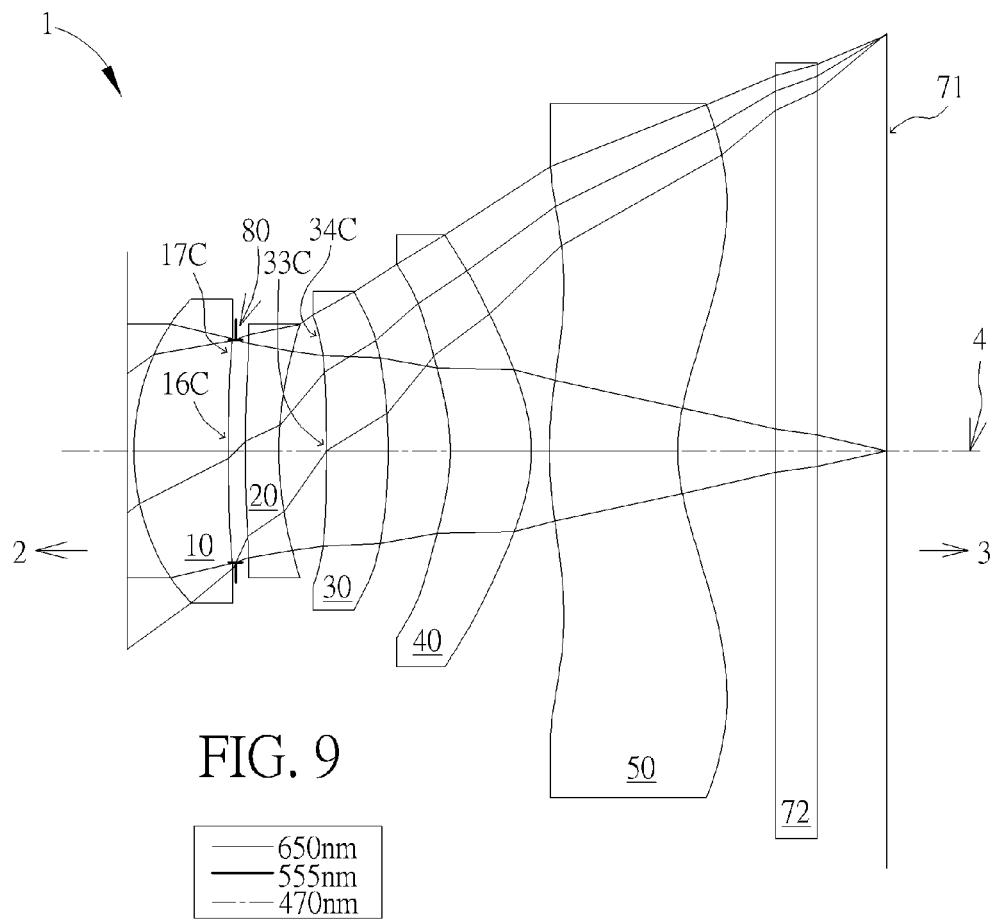
FIG. 9 illustrates a fifth example of the optical imaging lens set of five lens elements of the present invention.
Figures 10A, 10B, 10C, 10D:
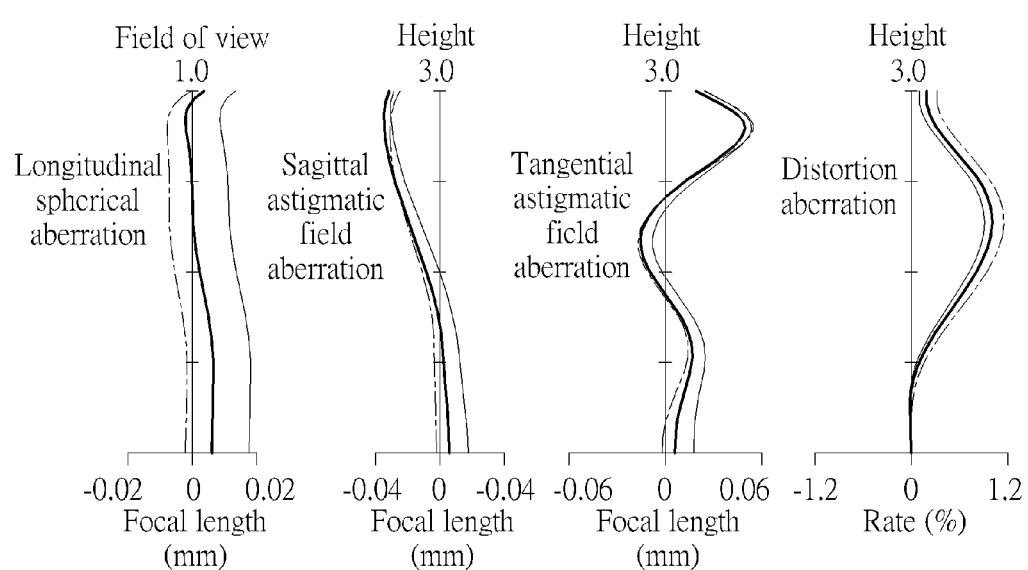
FIG. 10A illustrates the longitudinal spherical aberration on the image plane of the fifth example.
FIG. 10B illustrates the astigmatic aberration on the sagittal direction of the fifth example.
FIG. 10C illustrates the astigmatic aberration on the tangential direction of the fifth example.
FIG. 10D illustrates the distortion aberration of the fifth example.

Please refer to FIG. 9 which illustrates the fifth example of the optical imaging lens set 1 of the present invention. Please refer to FIG. 10A for the longitudinal spherical aberration on the image plane 71 of the fifth example; please refer to FIG. 10B for the astigmatic aberration on the sagittal direction; please refer to FIG. 10C for the astigmatic aberration on the tangential direction, and please refer to FIG. 10D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in this example, the first image-side surface 12 of the first lens element 10 is a concave surface, having a concave part 16C in a vicinity of the optical axis, and a concave part 17C in a vicinity of its circular periphery; the third object-side surface 31 of the third lens element 30 is a concave surface, having a concave part 33C in a vicinity of the optical axis and a concave part 34C in a vicinity of its circular periphery. The optical data of the fifth example of the optical imaging lens set are shown in FIG. 26 while the aspheric surface data are shown in FIG. 27. The length of the optical imaging lens set is 5.417 mm. The image height is 3.0 mm, HFOV is 35.91 degrees. Some important ratios of this example are as follows:
AAG/T3=2.346
BFL/T1=2.209
T2/(AG12+AG45)=0.955
T2/AG23=0.704
T5/AG34=2.062
T5/T4=1.581
AAG/T5=1.127
T5/(AG12+AG45)=3.670
BFL/(AG12+AG45)=5.974
BFL/T2=6.253
T1/T4=1.165
AAG/T1=1.529
T1/(AG12+AG45)=2.705
T1/AG23=1.994
T3/(AG12+AG45)=0.955
ALT/BFL=1.911
T3/T4=0.759

Sixth Example

Figure 11:
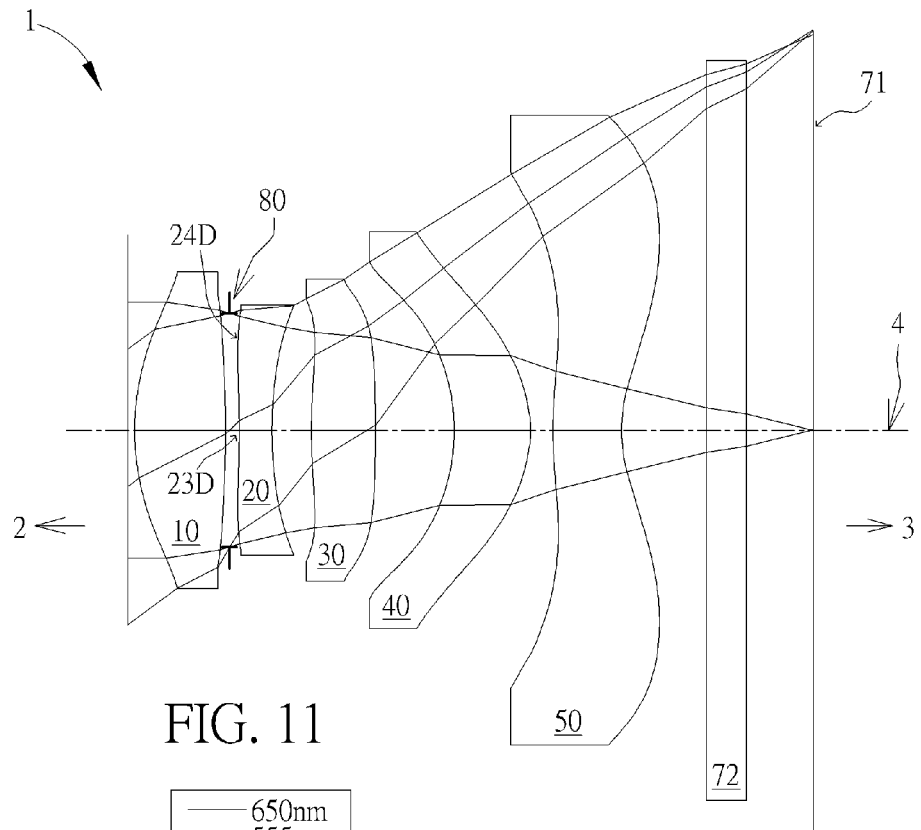
FIG. 11 illustrates a sixth example of the optical imaging lens set of five lens elements of the present invention.
Figures 12A, 12B, 12C, 12D:
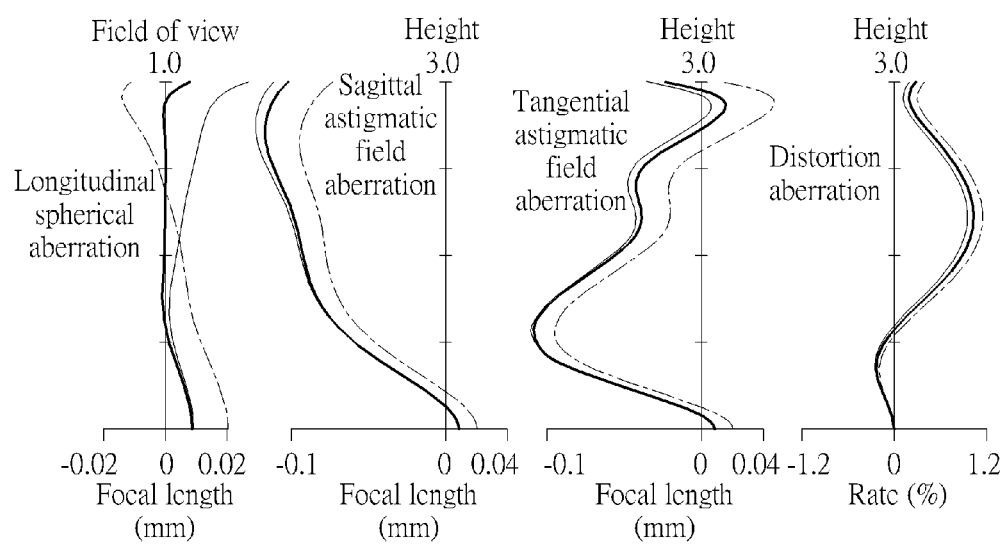
FIG. 12A illustrates the longitudinal spherical aberration on the image plane of the sixth example.
FIG. 12B illustrates the astigmatic aberration on the sagittal direction of the sixth example.
FIG. 12C illustrates the astigmatic aberration on the tangential direction of the sixth example.
FIG. 12D illustrates the distortion aberration of the sixth example.

Please refer to FIG. 11 which illustrates the sixth example of the optical imaging lens set 1 of the present invention. Please refer to FIG. 12A for the longitudinal spherical aberration on the image plane 71 of the sixth example; please refer to FIG. 12B for the astigmatic aberration on the sagittal direction; please refer to FIG. 12C for the astigmatic aberration on the tangential direction, and please refer to FIG. 12D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the second object-side surface 21 of the second lens element 20 has a concave part 23D in a vicinity of the optical axis, and a convex part 24D in a vicinity of its circular periphery. The optical data of the sixth example of the optical imaging lens set are shown in FIG. 28 while the aspheric surface data are shown in FIG. 29. The length of the optical imaging lens set is 5.083 mm. The image height is 3.0 mm, HFOV is 36.38 degrees. Some important ratios of this example are as follows:
AAG/T3=2.414
BFL/T1=2.105
T2/(AG12+AG45)=0.912
T2/AG23=0.828
T5/AG34=0.874
T5/T4=0.900
AAG/T5=2.243
T5/(AG12+AG45)=1.913
BFL/(AG12+AG45)=5.326
BFL/T2=5.838
T1/T4=1.191
AAG/T1=1.697
T1/(AG12+AG45)=2.530
T1/AG23=2.295
T3/(AG12+AG45)=0.912
ALT/BFL=1.738
T3/T4=0.837

Seventh Example

Figure 13:
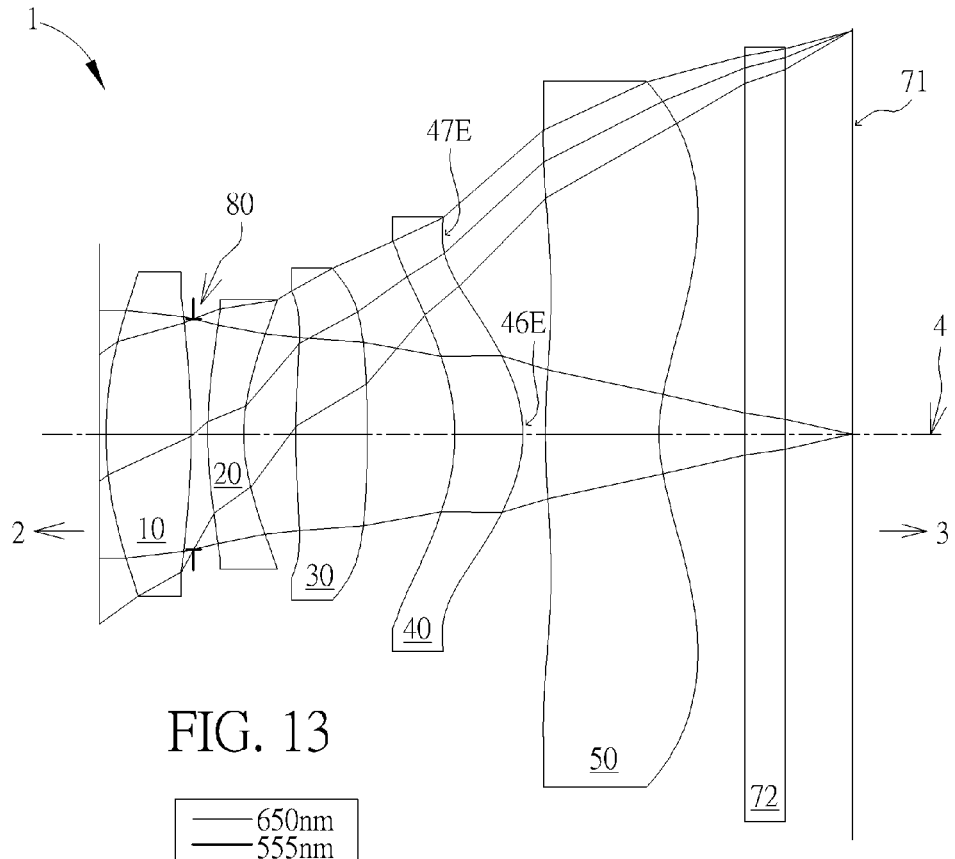
FIG. 13 illustrates a seventh example of the optical imaging lens set of five lens elements of the present invention.
Figures 14A, 14B, 14C, 14D:
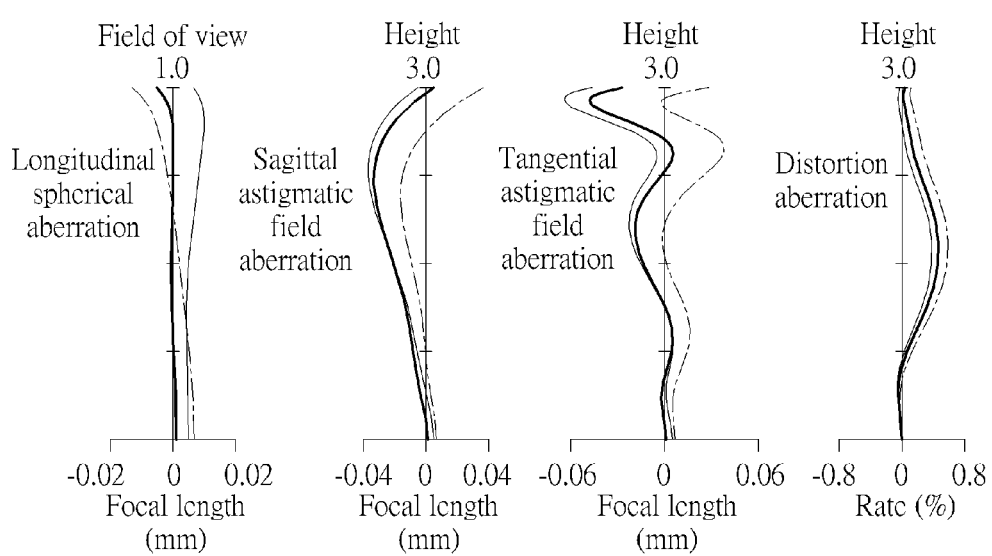
FIG. 14A illustrates the longitudinal spherical aberration on the image plane of the seventh example.
FIG. 14B illustrates the astigmatic aberration on the sagittal direction of the seventh example.
FIG. 14C illustrates the astigmatic aberration on the tangential direction of the seventh example.
FIG. 14D illustrates the distortion aberration of the seventh example.

Please refer to FIG. 13 which illustrates the seventh example of the optical imaging lens set 1 of the present invention. Please refer to FIG. 14A for the longitudinal spherical aberration on the image plane 71 of the seventh example; please refer to FIG. 14B for the astigmatic aberration on the sagittal direction; please refer to FIG. 14C for the astigmatic aberration on the tangential direction, and please refer to FIG. 14D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the fourth image-side surface 42 of the fourth lens element 40 has a convex part 46E in a vicinity of the optical axis, and a concave part 47E in a vicinity of its circular periphery. The optical data of the seventh example of the optical imaging lens set are shown in FIG. 30 while the aspheric surface data are shown in FIG. 31. The length of the optical imaging lens set is 5.537 mm. The image height is 3.0 mm, HFOV is 36.12 degrees. Some important ratios of this example are as follows:
AAG/T3=2.503
BFL/T1=2.274
T2/(AG12+AG45)=0.919
T2/AG23=0.688
T5/AG34=1.299
T5/T4=1.672
AAG/T5=1.572
T5/(AG12+AG45)=2.910
BFL/(AG12+AG45)=4.953
BFL/T2=5.393
T1/T4=1.251
AAG/T1=2.100
T1/(AG12+AG45)=2.178
T1/AG23=1.632
T3/(AG12+AG45)=0.919
ALT/BFL=1.933
T3/T4=1.050

Seventh Example

Please refer to FIG. 13 which illustrates the seventh example of the optical imaging lens set 1 of the present invention. Please refer to FIG. 14A for the longitudinal spherical aberration on the image plane 71 of the seventh example; please refer to FIG. 14B for the astigmatic aberration on the sagittal direction; please refer to FIG. 14C for the astigmatic aberration on the tangential direction, and please refer to FIG. 14D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the fourth image-side surface 42 of the fourth lens element 40 has a convex part 46E in a vicinity of the optical axis, and a concave part 47E in a vicinity of its circular periphery. The optical data of the seventh example of the optical imaging lens set are shown in FIG. 30 while the aspheric surface data are shown in FIG. 31. The length of the optical imaging lens set is 5.537 mm.

The image height is 3.0 mm, HFOV is 36.12 degrees. Some important ratios of this example are as follows:
AAG/T3=2.503
BFL/T1=2.274
T2/(AG12+AG45)=0.919
T2/AG23=0.688
T5/AG34=1.299
T5/T4=1.672
AAG/T5=1.572
T5/(AG12+AG45)=2.910
BFL/(AG12+AG45)=4.953
BFL/T2=5.393
T1/T4=1.251
AAG/T1=2.100
T1/(AG12+AG45)=2.178
T1/AG23=1.632
T3/(AG12+AG45)=0.919
ALT/BFL=1.933
T3/T4=1.050

Some important ratios in each example are shown in FIG. 32.

The applicant summarized the efficacy of each embodiment mentioned above as following:

1. In the present invention, the first lens element has positive refractive power, to provide the needed refractive power for the optical imaging lens set. The second lens element has negative refractive power, to correct aberration; in addition, the third and the fourth lens elements have positive refractive power, to additional provide the needed refractive power for the optical imaging lens set, and simplifying the difficulties in manufacturing process.

2. The first object-side surface is a convex surface, helping to collect the image light; the second object-side surface has a concave part in the vicinity of its circular periphery; the third object-side surface has a concave part in the vicinity of its circular periphery; the fourth object-side surface has a concave part in the vicinity of its circular periphery; the fourth image-side surface has a convex part in the vicinity of the optical axis; the fifth image-side surface has a concave part in the vicinity of the optical axis and a convex part in the vicinity of its circular periphery, these lens elements are matched to each other, to ensure the image quality.

3. In addition, the inventors discover that there are some better ratio ranges for different data according to the above various important ratios. Better ratio ranges help the designers to design the better optical performance and an effectively reduced length of a practically possible optical imaging lens set. For example:

3.1 AAG/T3≤3.0; AAG/T5≤2.5; AAG/T1≤2.2:

AAG is the sum of total four air gaps between adjacent lens elements from the first lens element to the fifth lens element along the optical axis. T1, T3 and T5 are the thickness of the first lens element 10, the third lens element 30 and the fifth lens element 50 along the optical axis 4 respectively. Decreasing those parameters mentioned above can help for shrinking the total length of the optical imaging lens set, but considering the difficulties of during the manufacturing process, T1, T3 and T5 cannot be shrunk effectively, but AAG can be shrunk compared with T1, T3 and T5. Therefore, AAG/T3, AAG/T5 and AAG/T1 should preferably be small. Preferably, AAG/T3 should be smaller than or equal to 3.0, ideally, it is suggested that the range may be 1.0~3.0; AAG/T5 should be smaller than or equal to 2.5, ideally, it is suggested that the range may be 0.8~2.5; AAG/T1 should be smaller than or equal to 2.2, ideally, it is suggested that the range may be 1.0~2.2.

3.2 T2/AG23≥0.65; T5/AG34≥0.8; T1/AG23≥1.5:

As mentioned above, the thickness cannot be shrunk effectively, so the air gaps between every two adjacent lens elements should be shrunk so as to decrease the total length of the optical imaging lens set. Therefore, T2/AG23, T5/AG34 and T1/AG23 should preferably be large. Preferably, T2/AG23 should be larger than or equal to 0.65, ideally, it is suggested that the range may be 0.65~2.0; T5/AG34 should be larger than or equal to 0.8, ideally, it is suggested that the range may be 0.8~2.5; T1/AG23 should be larger than or equal to 1.5, ideally, it is suggested that the range may be 1.5~3.5.

3.3 T5/(AG12+AG45)≥1.5, BFL/(AG12+AG45)≥4.5, T2/(AG12+AG45)≥0.9, T1/(AG12+AG45)≥2.0, T3/(AG12+AG45)≥0.9:

As mentioned above, shrinking the air gaps between every two adjacent lens elements can help to decrease the total length of the optical imaging lens set. Therefore, T5/(AG12+AG45), BFL/(AG12+AG45), T2/(AG12+AG45), T1/(AG12+AG45) and T3/(AG12+AG45) should preferably be large. Preferably, T5/(AG12+AG45) should be larger than or equal to 1.5, ideally, it is suggested that the range may be 1.5~6.0; BFL/(AG12+AG45) should be larger than or equal to 4.5, ideally, it is suggested that the range may be 4.5~12.0; T2/(AG12+AG45) should be larger than or equal to 0.9, ideally, it is suggested that the range may be 0.9~2.0; T1/(AG12+AG45) should be larger than or equal to 2.0, ideally, it is suggested that the range may be 2.0~4.0; T3/(AG12+AG45) should be larger than or equal to 0.9, ideally, it is suggested that the range may be 1.4~2.0.

3.4 BFL/T1≤3.3, T5/T4≥0.9, BFL/T2≤6.6, T1/T4≥1.0, ALT/BFL≥1.4, T3/T4≥0.75:

T1-T5 are the central thickness of the first lens element 10 to the fifth lens element 50 on the optical axis 4, BFL is the back focal length of the optical imaging lens set, those parameters should be maintained within a suitable value range. Otherwise, the total length cannot be thinned if one lens element has too big central thickness, or it's difficult to manufacture the optical imaging lens set if one lens element has too small central thickness. Preferably, BFL/T1 should be smaller than or equal to 3.3, ideally, it is suggested that the range may be 1.5~3.3; T5/T4 should be larger than or equal to 0.9, ideally, it is suggested that the range may be 0.9~2.5; BFL/T2 should be smaller than or equal to 6.6, ideally, it is suggested that the range may be 3.5~6.6; T1/T4 should be larger than or equal to 1.0, ideally, it is suggested that the range may be 1.0~1.8; ALT/BFL should be larger than or equal to 1.4, ideally, it is suggested that the range may be 1.4~2.5; T3/T4 should be larger than or equal to 0.75, ideally, it is suggested that the range may be 0.75~1.5.

Figure 16:
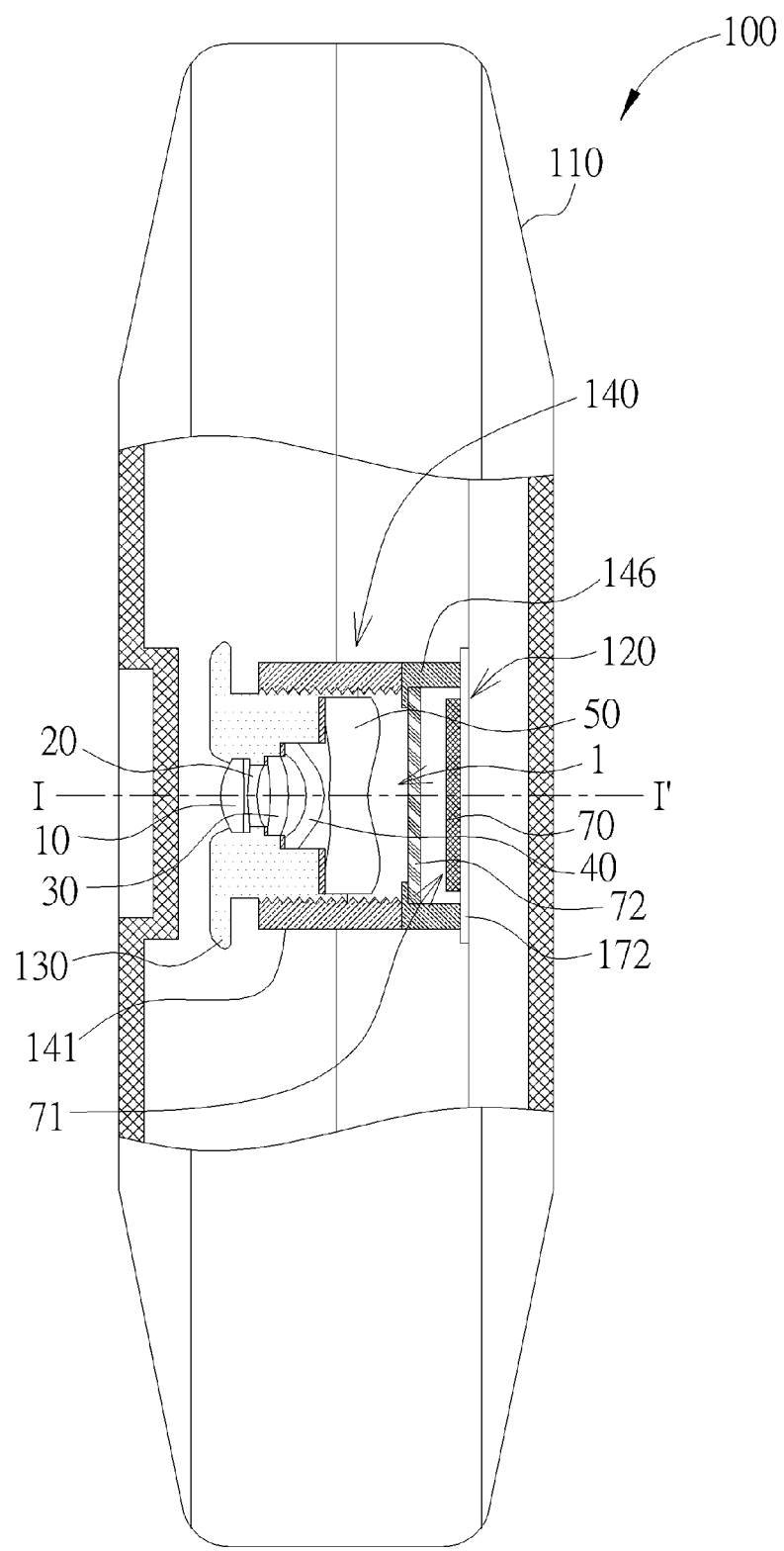
FIG. 16 illustrates a first preferred example of the portable electronic device with an optical imaging lens set of the present invention.

The optical imaging lens set 1 of the present invention may be applied to a portable electronic device. Please refer to FIG. 16. FIG. 16 illustrates a first preferred example of the optical imaging lens set 1 of the present invention for use in a portable electronic device 100. The portable electronic device 100 includes a case 110, and an image module 120 mounted in the case 110. A mobile phone is illustrated in FIG. 16 as an example, but the portable electronic device 100 is not limited to a mobile phone.

As shown in FIG. 16, the image module 120 includes the optical imaging lens set 1 as described above. FIG. 16 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 72 may be omitted in other examples although the optional filter 72 is present in this example. The case 110, the barrel 130, and/or the module housing unit 140 may be a single element or consist of a plurality of elements, but the present invention is not limited to this.

Each one of the five lens elements 10, 20, 30, 40 and 50 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Figure 17:
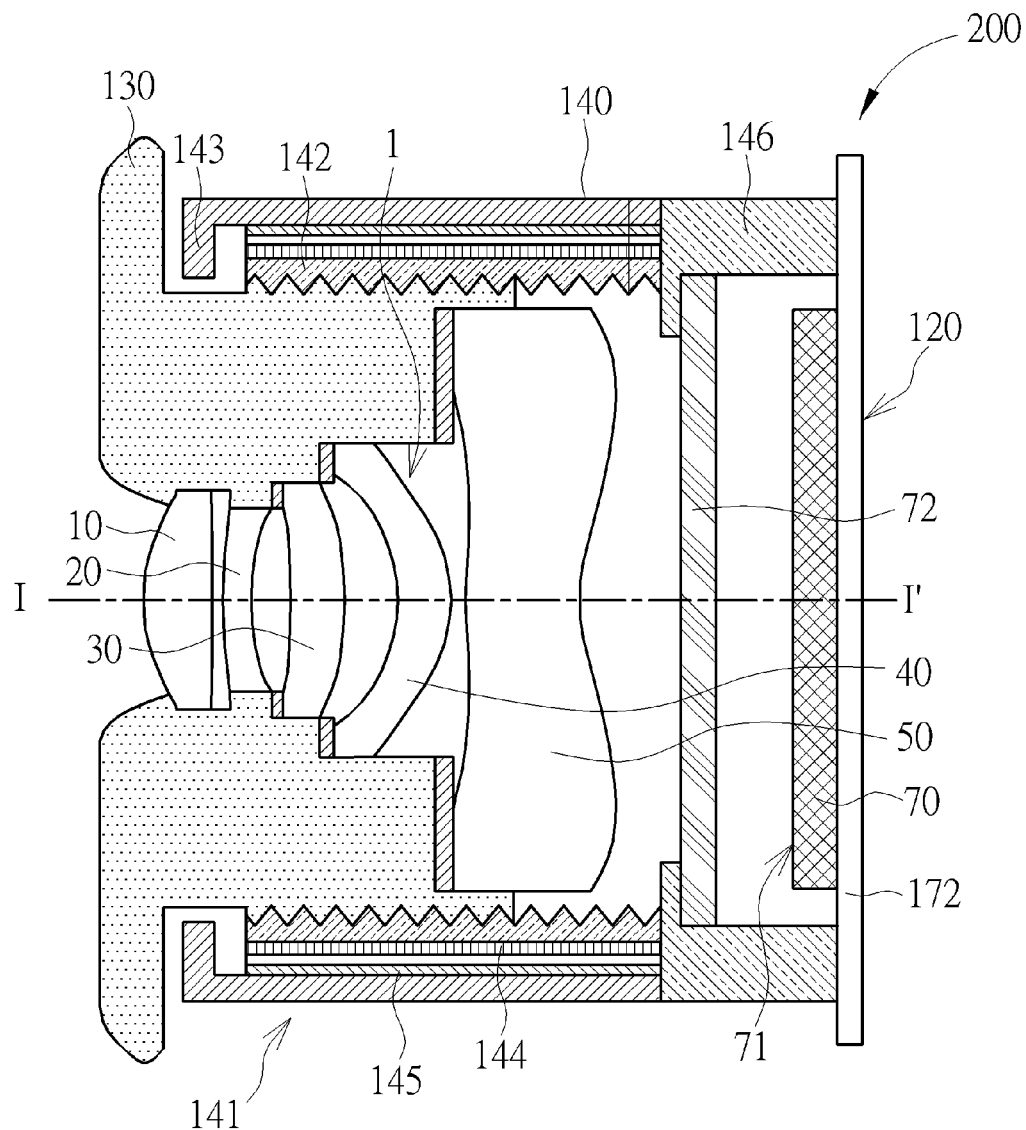
FIG. 17 illustrates a second preferred example of the portable electronic device with an optical imaging lens set of the present invention.

Please also refer to FIG. 17 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. The filter 72, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, an aperture stop, a second lens element, a third lens element, a fourth lens element and a fifth lens element, said first to fifth lens elements having an object-side surface facing toward the object side as well as an image-side surface facing toward the image side, wherein:

the first lens element has positive refractive power, having a convex object-side surface with a convex part in a vicinity of the optical axis and with a convex part in a vicinity of its periphery;

the second lens element has negative refractive power, having an object-side surface with a convex part in a vicinity of its periphery;

the third lens element has positive refractive power, having an object-side surface with a concave part in a vicinity of its periphery;

the fourth lens element has positive refractive power, having an object-side surface with a concave part in a vicinity of its periphery, and an image-side surface with a convex part in a vicinity of the optical axis; and the fifth lens element has an image-side surface with a concave part in a vicinity of the optical axis, and a convex part in a vicinity of its periphery;

the optical imaging lens set does not include any lens element with refractive power other than said first lens element, second lens element, third lens element, fourth lens element and fifth lens element, in addition, a thickness T1 of said first lens element along said optical axis, a distance AG12 between the first lens element and the second lens element along the optical axis, a distance AG45 between the fourth lens element and the fifth lens element along the optical axis, a sum of all four air gaps AAG between each lens element from said first lens element to said fifth lens element along the optical axis, a thickness T2 of said second lens element along said optical axis, and a thickness T3 of said third lens element along said optical axis satisfy the relationships $AAG/T3 \leq 3.0$, $0.9 \leq T2/(AG12+AG45) \leq 2.0$ and $2.0 \leq T1/(AG12+AG45) \leq 4.0$.

2. The optical imaging lens set of claim 1, wherein a distance BFL between the image surface of the fifth lens element to an image plane satisfies a relationship $BFL/T1 \leq 3.3$.

3. The optical imaging lens set of claim 2, wherein a thickness T5 of said fifth lens element along said optical axis satisfies a relationship $AAG/T5 \leq 2.5$.

4. The optical imaging lens set of claim 2, wherein a thickness T5 of said fifth lens element along said optical axis, satisfies a relationship $1.5 \leq T5/(AG12+AG45) \leq 6.0$.

5. The optical imaging lens set of claim 2, wherein further satisfying a relationship $4.5 \leq BFL/(AG12+AG45) \leq 12.0$.

6. The optical imaging lens set of claim 1, wherein a distance BFL between the image surface of the fifth lens element to an image plane satisfies a relationship $BFL/T2 \leq 6.6$.

7. The optical imaging lens set of claim 1, wherein a thickness T4 of said fourth lens element along said optical axis satisfies a relationship $1.0 \leq T1/T4 \leq 1.8$.

8. The optical imaging lens set of claim 1, wherein a distance AG23 between the second lens element and the third lens element along the optical axis satisfies a relationship $0.65 \leq T2/AG23 \leq 2.0$.

9. The optical imaging lens set of claim 8, wherein further satisfying a relationship $AAG/T1 \leq 2.2$.

10. The optical imaging lens set of claim 1, wherein a thickness T5 of said fifth lens element along said optical axis, and a distance AG34 between the third lens element and the fourth lens element along the optical axis satisfy a relationship $0.8 \leq T5/AG34 \leq 2.5$.

11. The optical imaging lens set of claim 10, wherein a distance AG23 between the second lens element and the third lens element along the optical axis satisfies a relationship $1.5 \leq T1/AG23 \leq 3.5$.

12. The optical imaging lens set of claim 11, wherein further satisfying a relationship $0.9 \leq T3/(AG12+AG45) \leq 2.0$.

13. The optical imaging lens set of claim 1, wherein a thickness T4 of said fourth lens element along said optical axis, and a thickness T5 of said fifth lens element along said optical axis satisfy a relationship $0.9 \leq T5/T4 \leq 2.5$.

14. The optical imaging lens set of claim 13, wherein a total thickness ALT of said first lens element, said second lens element, said third lens element, said fourth lens element and said fifth lens element along said optical axis, and a distance BFL between the image surface of the fifth lens element to an image plane satisfy a relationship $1.4 \leq ALT/BFL \leq 2.5$.

15. The optical imaging lens set of claim 13, further satisfying a relationship $0.75 \leq T3/T4 \leq 1.5$.

16. An electronic device, comprising:
   a case; and
   an image module disposed in said case and comprising:
      an optical imaging lens set of claim 1;
      a barrel for an installation of said optical imaging lens set;
      a module housing unit for an installation of said barrel;
      a substrate for an installation of said module housing unit; and
      an image sensor disposed on the substrate and disposed at an image side of said optical imaging lens set.

* * * * *